United States Patent
Huang et al.

(10) Patent No.: US 9,820,543 B2
(45) Date of Patent: Nov. 21, 2017

(54) GROOVED CASE CONSTRUCTION FOR AN ELECTRONIC DEVICE

(71) Applicant: World Richman Manufacturing Corporation, Elgin, IL (US)

(72) Inventors: Edison Huang, Foshan (CN); Sararut Sirichai, Bangkok (TH); Iordanka Koleva Mulhern, Milwaukee, WI (US)

(73) Assignee: WORLD RICHMAN MANUFACTURING CORPORATION, Elgin, IL (US)

( * ) Notice: Subject to any disclaimer, the term of this patent is extended or adjusted under 35 U.S.C. 154(b) by 0 days.

(21) Appl. No.: 15/140,447

(22) Filed: Apr. 27, 2016

(65) Prior Publication Data
US 2016/0316872 A1 Nov. 3, 2016

Related U.S. Application Data

(60) Provisional application No. 62/154,030, filed on Apr. 28, 2015.

(51) Int. Cl.
*A45C 11/00* (2006.01)
*H04B 1/3888* (2015.01)
(Continued)

(52) U.S. Cl.
CPC ............ *A45C 11/00* (2013.01); *H04B 1/3888* (2013.01); *H04M 1/185* (2013.01);
(Continued)

(58) Field of Classification Search
CPC .............. A45C 11/00; A45C 2011/002; A45C 2011/003; A45F 5/00; G06F 1/16;
(Continued)

(56) References Cited

U.S. PATENT DOCUMENTS 8,498,100 B1 * 7/2013 Whitt, III .............. G06F 1/1618
361/679.29
8,699,215 B2 * 4/2014 Whitt, III .............. G06F 1/1618
361/679.29
(Continued)

*Primary Examiner* — Bryon Gehman
(74) *Attorney, Agent, or Firm* — Christopher J. Scott

(57) ABSTRACT

A grooved case construction selectively encases and displays an electronic device, and includes a grooved device-holding mechanism and either a panel assembly or a kickstand element made structurally cooperable with the device-holding mechanism. The device-holding mechanism is sized and shaped to removably receive an electronic device, and provides an anterior device-receiving section and a posterior component interface. The posterior component interface includes at least one, but preferably a plurality of component-receiving grooves for providing a grooved pattern. Both the panel assembly and the kickstand couple to the posterior component interface via the grooved pattern and may be so coupled in any number of orientations for providing the user with any number of options for displaying the device-holding mechanism. When outfitted with a panel assembly, a cover panel may selectively either cover the anterior device-receiving section or provide support for the device-holding mechanism.

16 Claims, 24 Drawing Sheets

(51) Int. Cl.
*H04M 1/18* (2006.01)
*H04M 1/02* (2006.01)

(52) U.S. Cl.
CPC ... *A45C 2011/002* (2013.01); *A45C 2011/003* (2013.01); *A45C 2200/15* (2013.01); *G06F 2200/1633* (2013.01); *H04M 1/0214* (2013.01)

(58) Field of Classification Search
CPC .... G06F 1/1618; G06F 1/1626; G06F 1/1628; H04B 1/3888; H04M 1/185
USPC ........................................................ 206/320
See application file for complete search history.

(56) References Cited

U.S. PATENT DOCUMENTS

| | | | |
|---|---|---|---|
| 8,807,333 B1 * | 8/2014 | Cooper | A45C 11/00 206/320 |
| 8,833,555 B2 | 9/2014 | Bennett et al. | |
| 8,952,254 B2 | 2/2015 | Yu et al. | |
| 9,075,566 B2 * | 7/2015 | Whitt, III | G06F 1/16 |
| 9,078,338 B2 * | 7/2015 | Ohtaka | G06F 1/1628 |
| 9,104,371 B2 * | 8/2015 | Sartee | G06F 1/1632 |
| 9,315,004 B2 * | 4/2016 | Balaji | G06F 1/1628 |
| 9,678,542 B2 * | 6/2017 | Whitt, III | G06F 1/166 |
| 2012/0287565 A1 | 11/2012 | Bennett et al. | |
| 2014/0001087 A1 | 1/2014 | Yu et al. | |

* cited by examiner

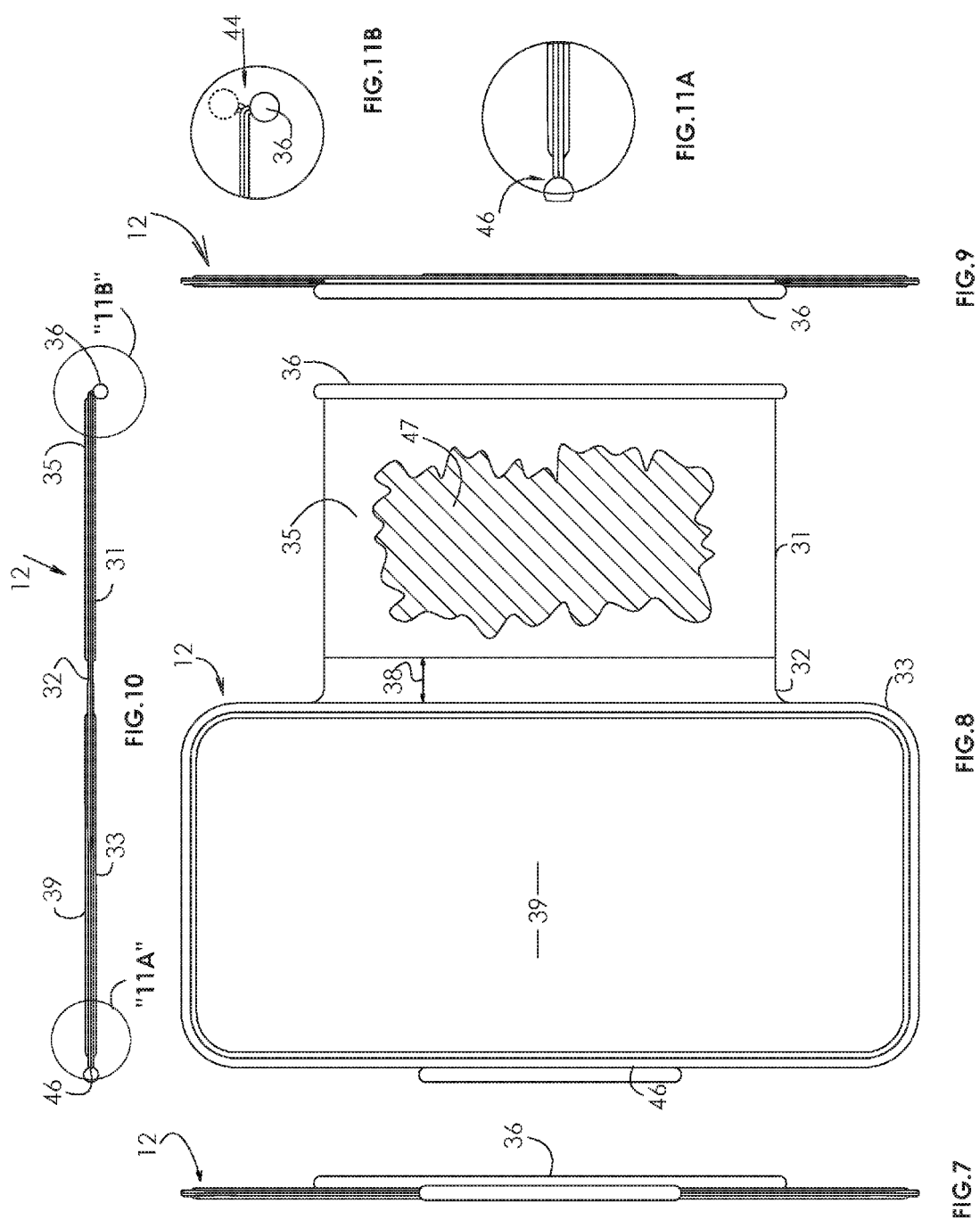

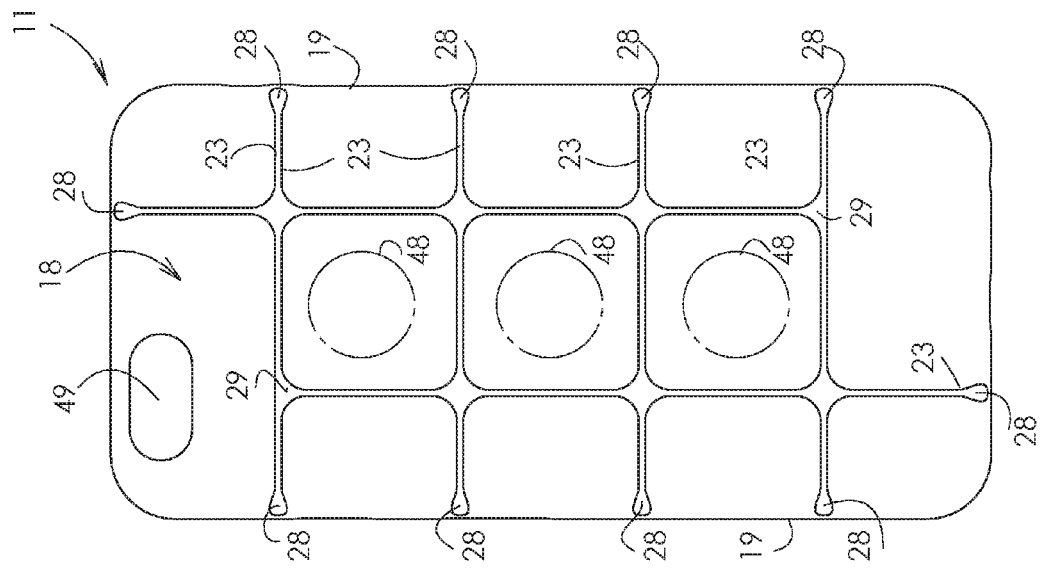
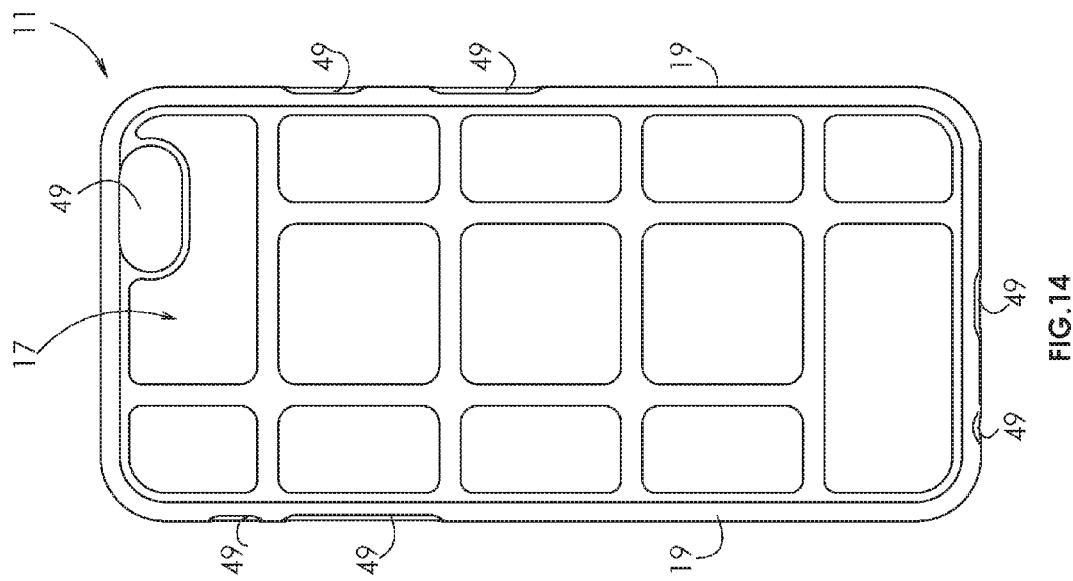

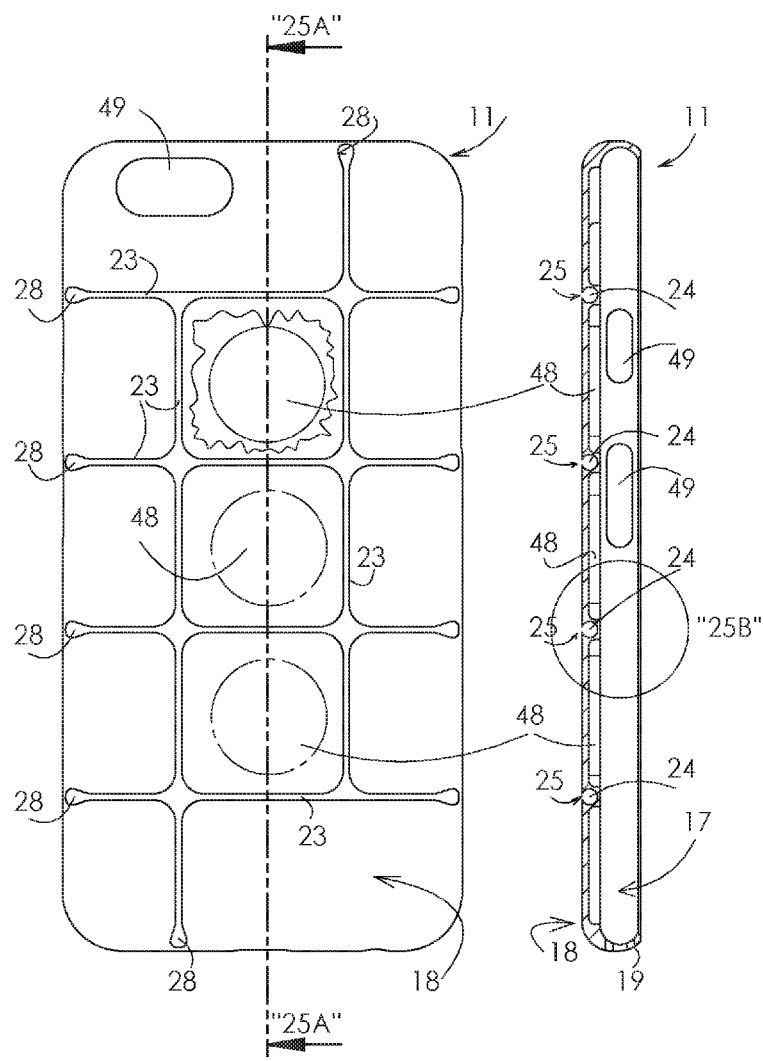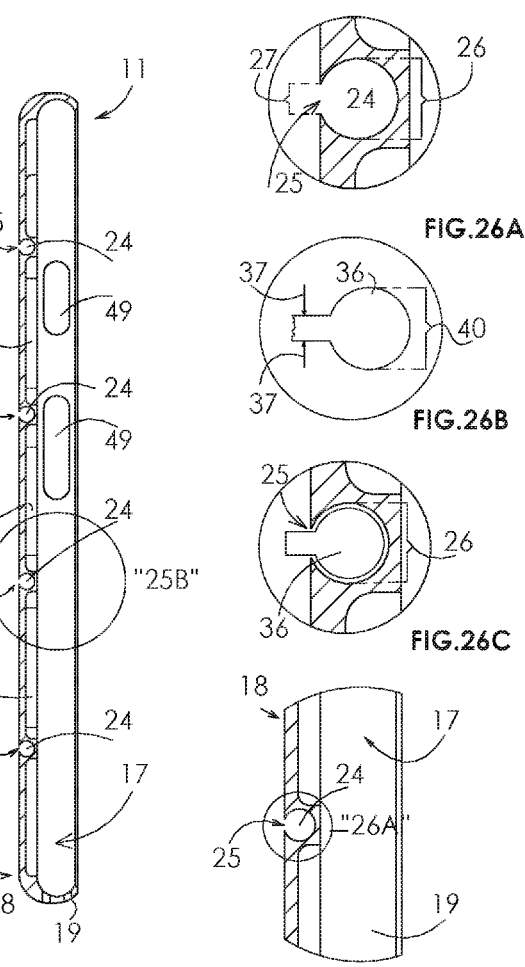
FIG.25  FIG.25A  FIG.25B
FIG.26A
FIG.26B
FIG.26C

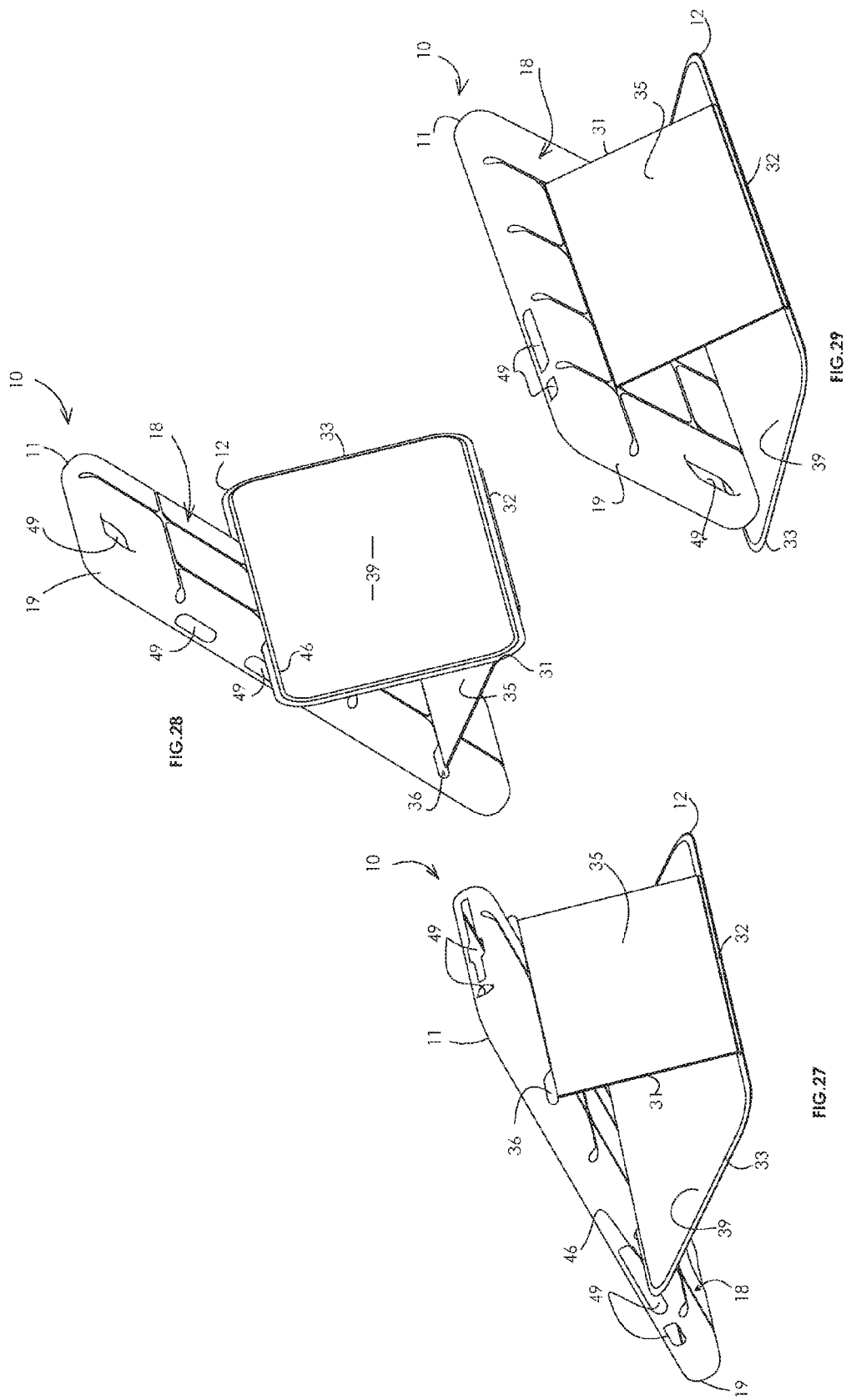

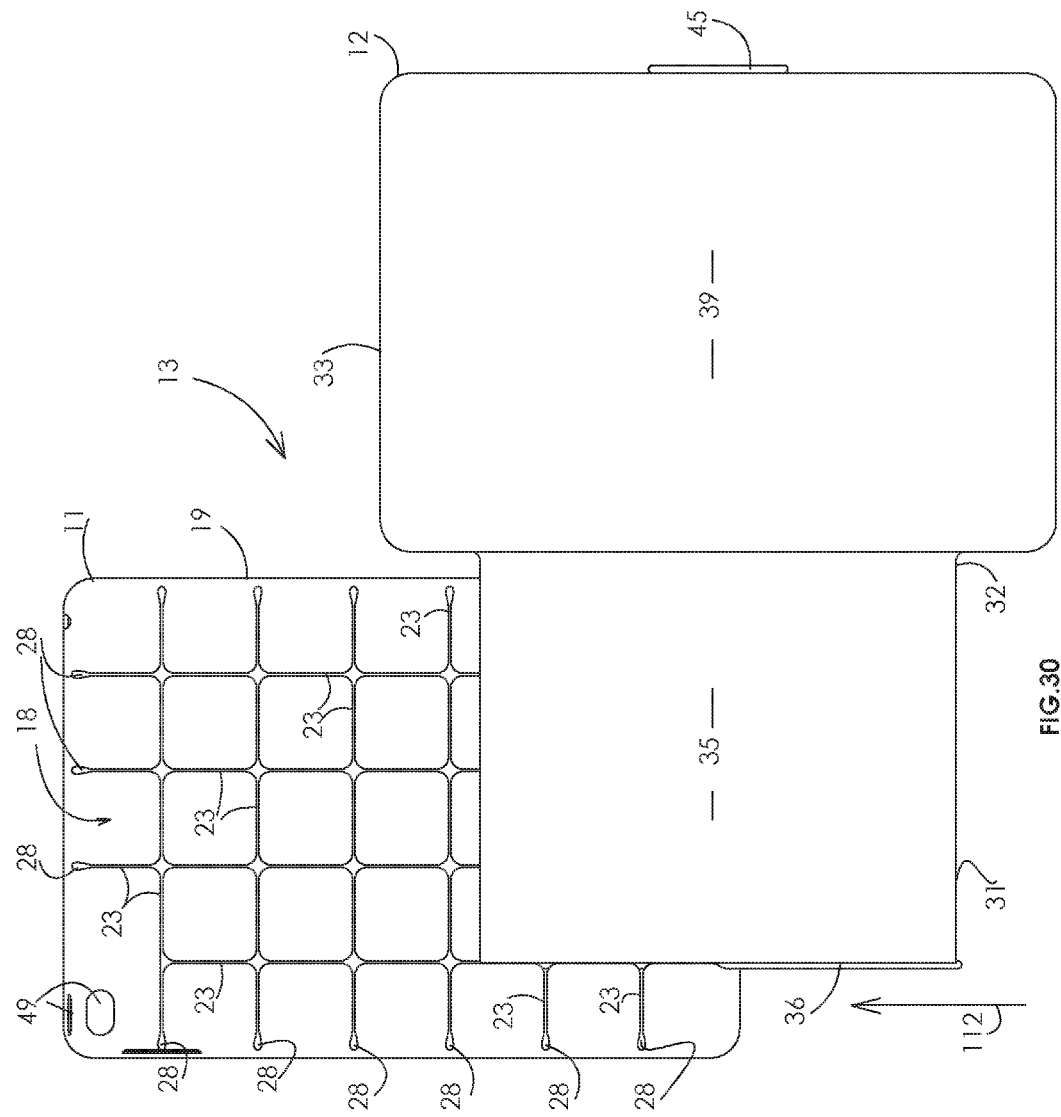

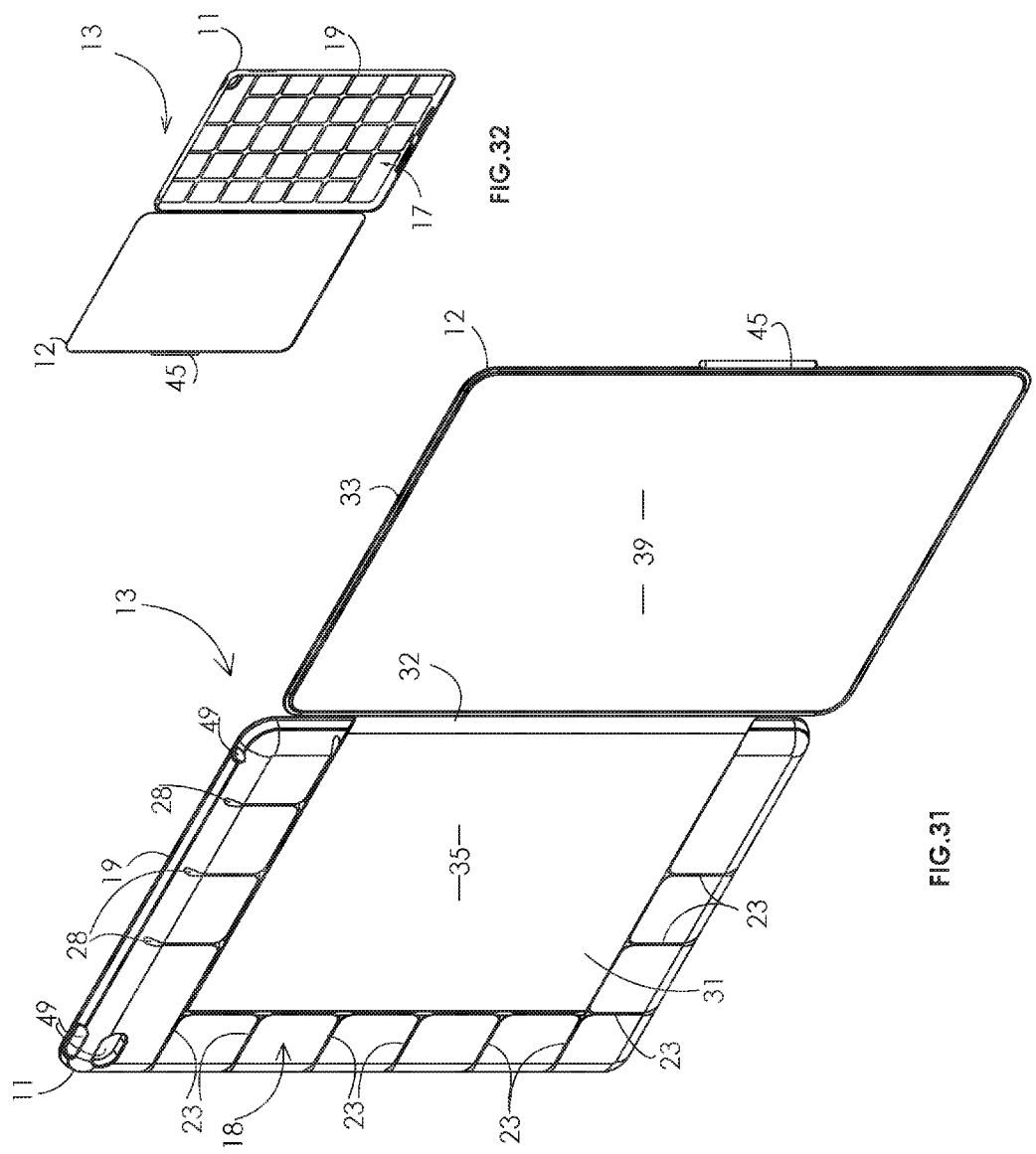

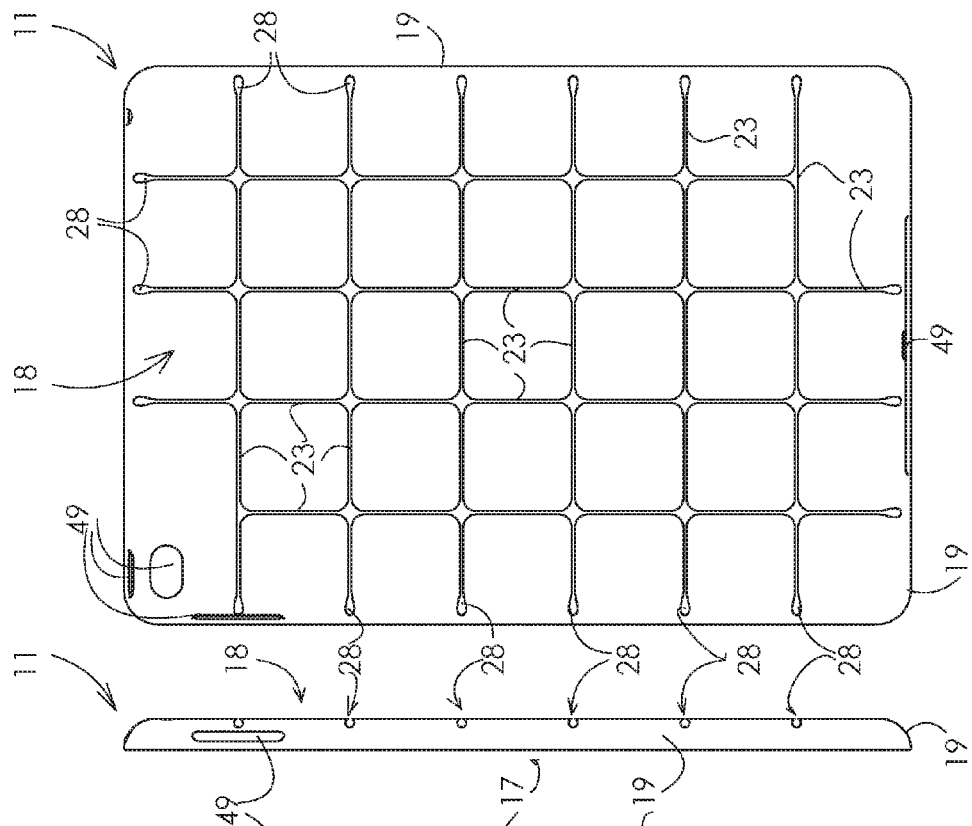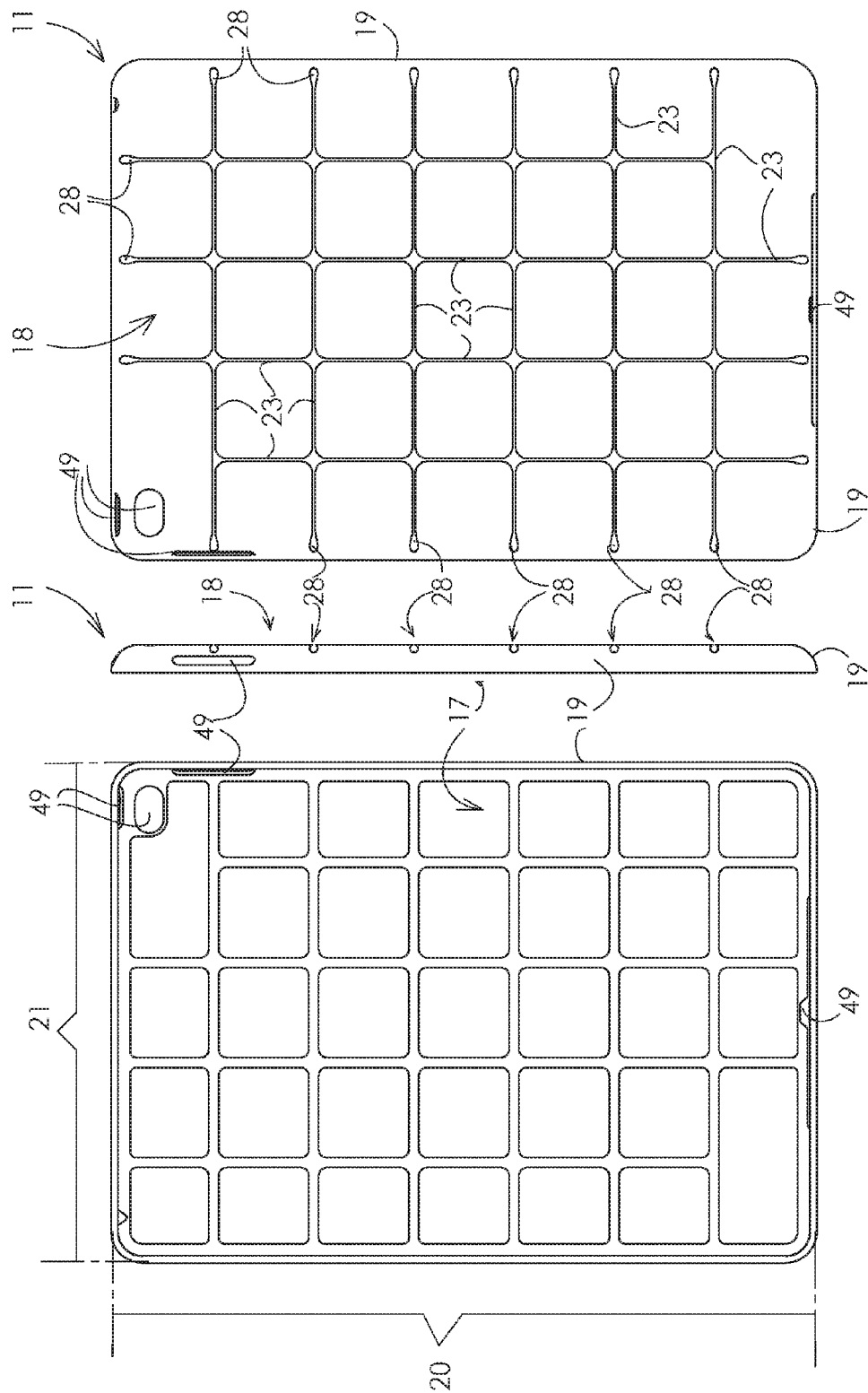

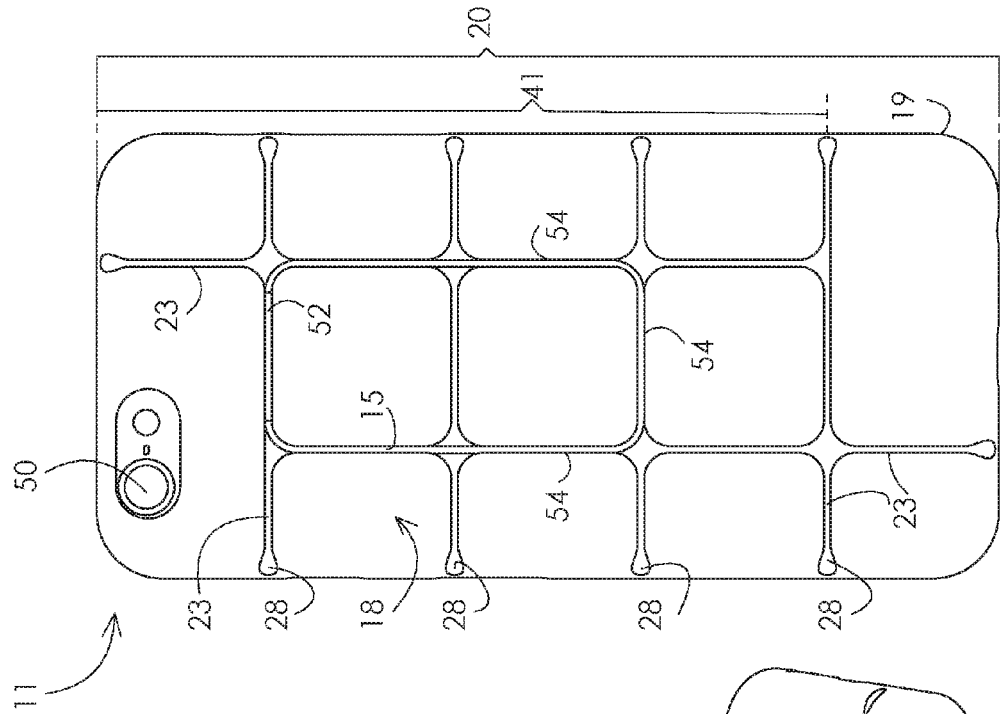
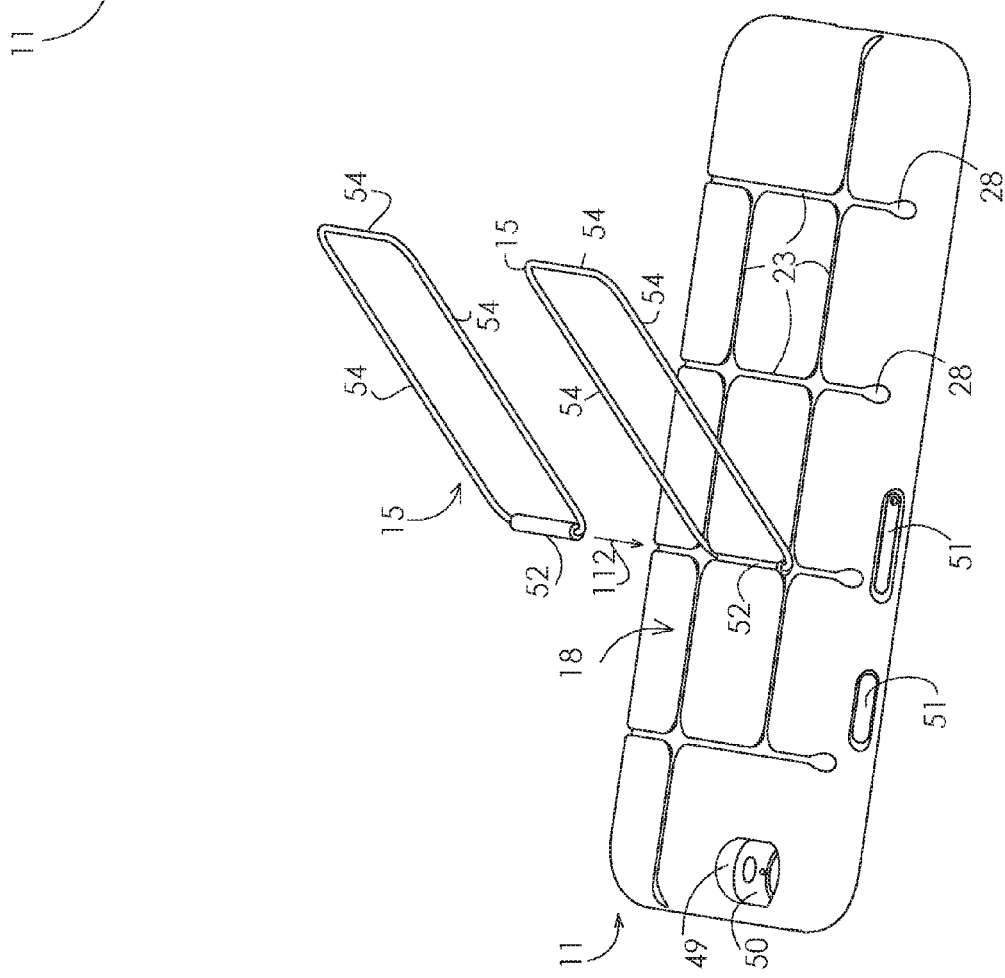
FIG. 37
FIG. 36

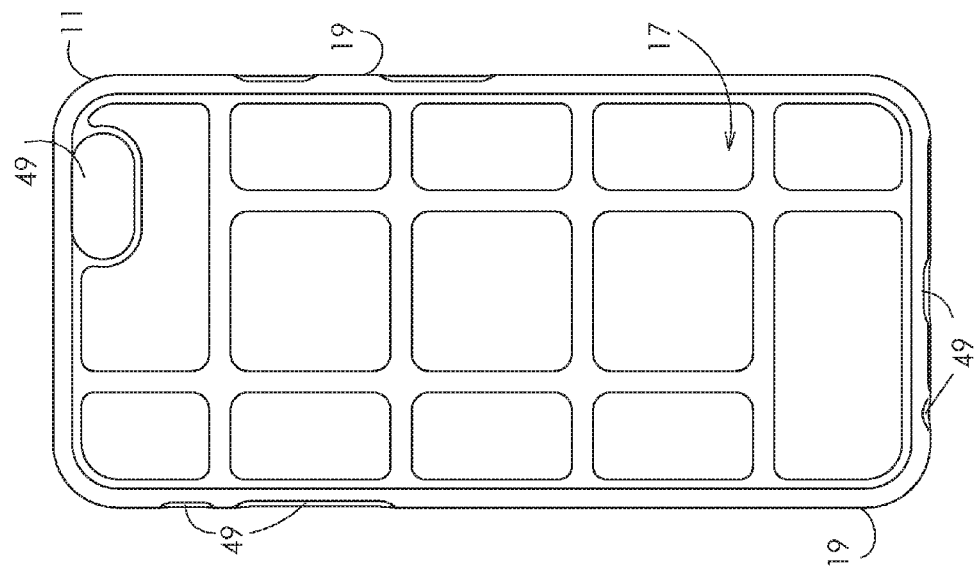
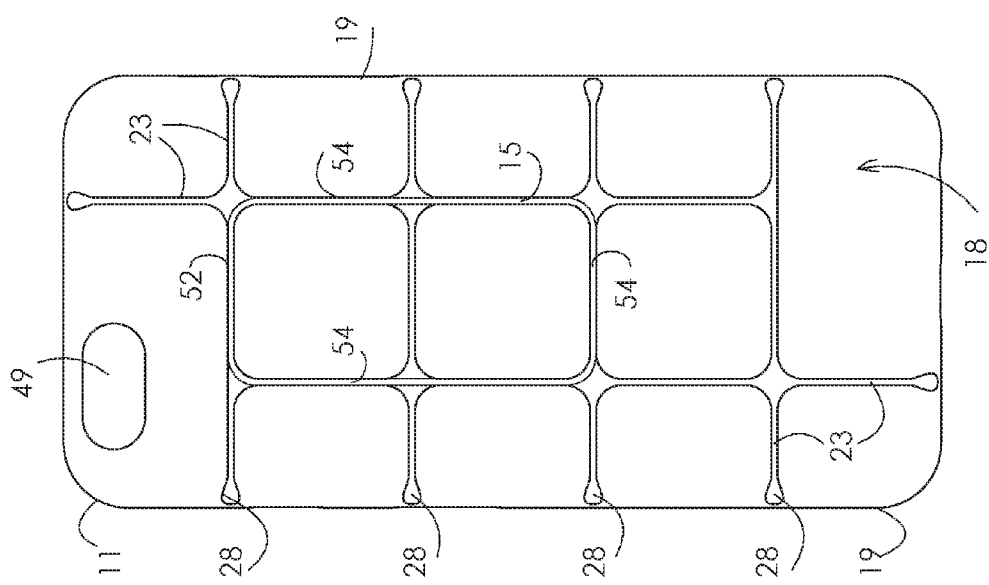

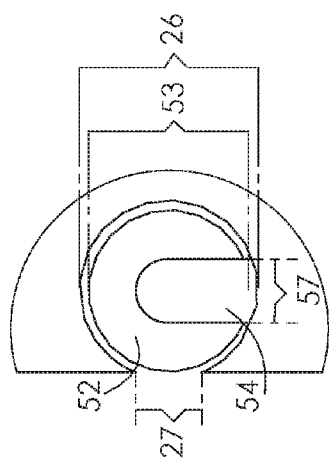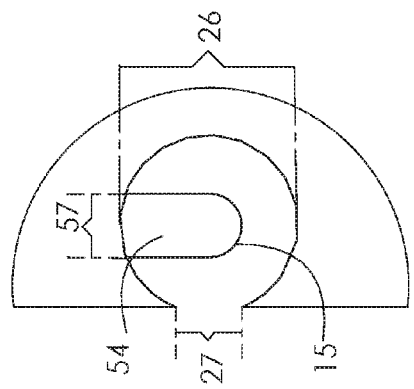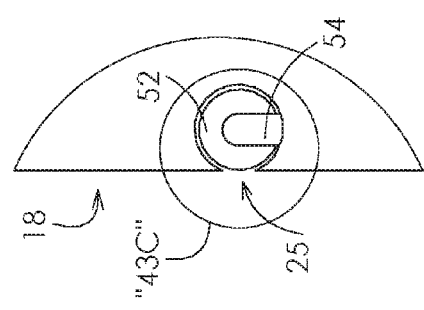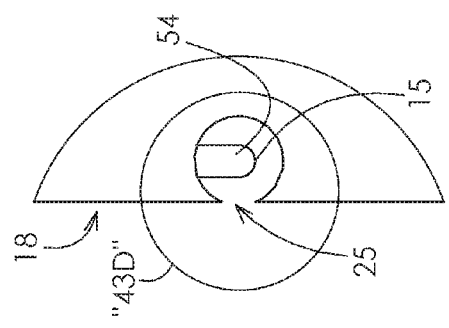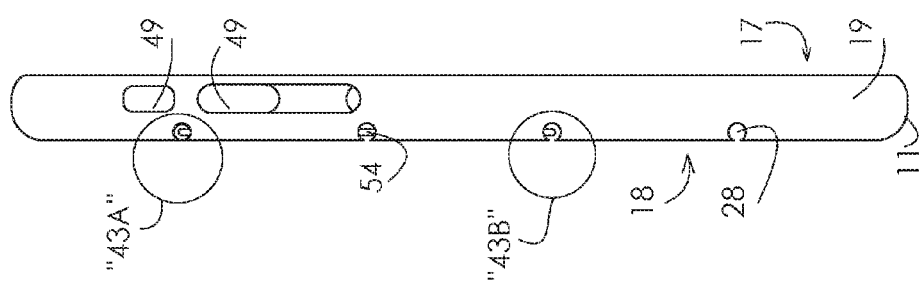

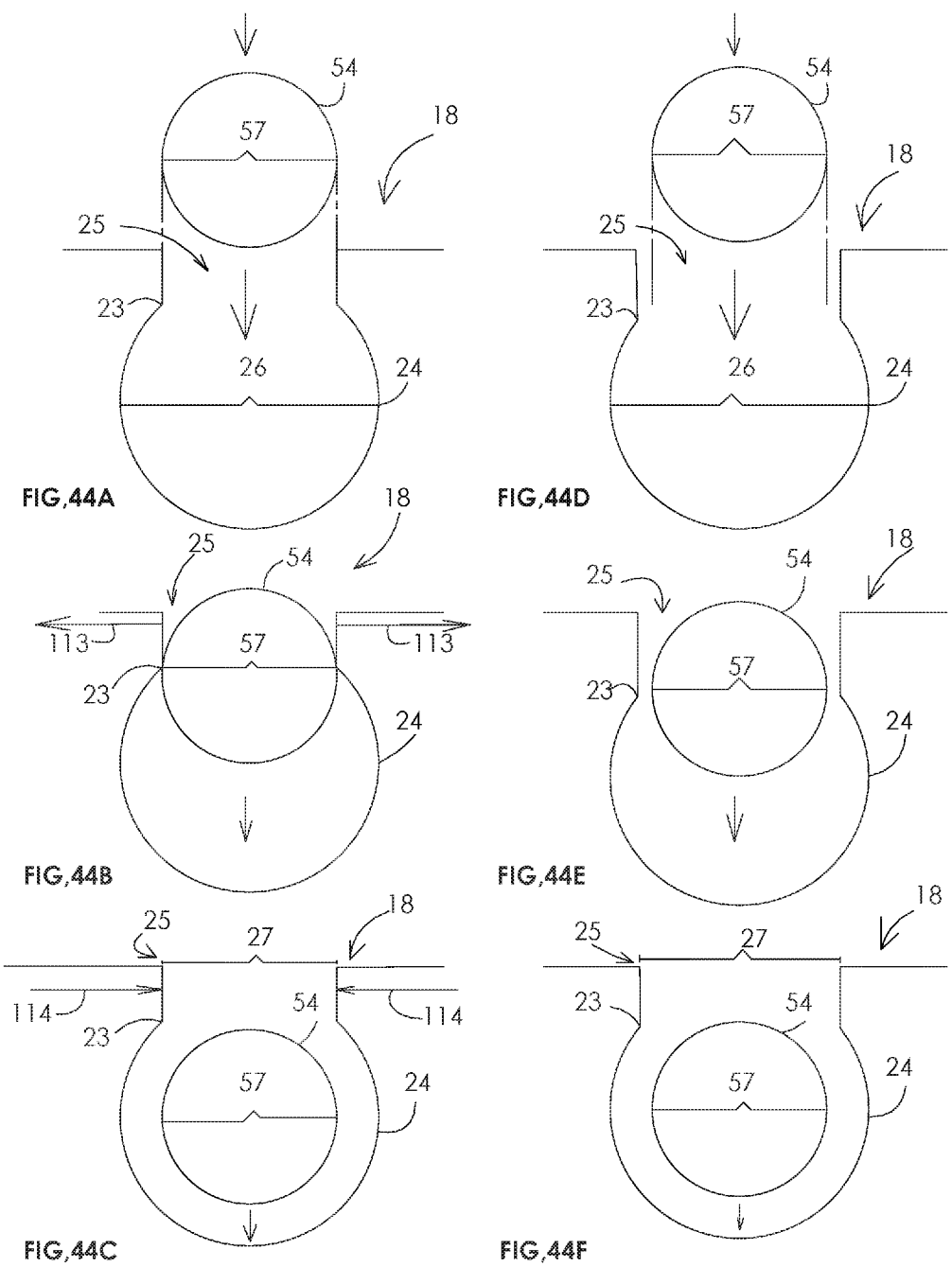

GROOVED CASE CONSTRUCTION FOR AN ELECTRONIC DEVICE

PRIOR HISTORY

This patent application claims the benefit of U.S. Provisional Patent Application No. 62/154,030 filed in the United States Patent and Trademark Office on 28 Apr. 2016.

BACKGROUND OF THE INVENTION

Field of the Invention

The disclosed invention generally relates to a case construction for encasing an electronic device such as a laptop type computer, tablet type computer or mobile communications device. More particularly, the disclosed invention provides a grooved device-holding case construction for enabling a user to selectively encase an electronic device and/or selectively display the electronic device.

Brief Description of the Prior Art

Case constructions for use in combination with electronic devices such as tablet type computers and the like are well known in this field of art. While the basic function of a basic case construction is to protect and/or enclose the device it encases, the art continues to develop with an eye toward enhancing functionality of the case constructions so as to provide the user with various means of manipulating and/or re-positioning the devices. A few of the more pertinent prior art patent-related disclosures relating to cradle-like devices for holding and enabling display of the devices they hold are described hereinafter.

United States Patent Application Publication No. 2012/0287565 and U.S. Pat. No. 8,833,555, authored by Bennett et al., disclose a Case having an Interchangeable Cover. The Bennett et al. teachings describe an apparatus for protecting an electronic device having a first protective cover component and a second protective component that may be removably coupled to one another. The second protective cover component includes a hinge component having a flexible hinge portion extending from a peripheral portion of the second protective cover component, wherein the hinge component facilitates coupling of the second protective cover component to the first protective cover component. One of the first protective cover component and the second protective cover component include a region configured to receive the electronic device.

United States Patent Application Publication No. 2014/0001087 and U.S. Pat. No. 8,952,254, authored by Yu et al. disclose an Electronic Device Cover. The Yu et al. teachings describe an electronic device cover having a base and a protection member. The base defines a positioning slot, a latch slot, and a through hole. The latch slot is in communication with the positioning slot, and the through hole is below the positioning slot. The protection member is configured to be secured to the base in a protection position and a stand position.

When the protection member is in the protection position, the protection member is engaged in the latch slot, and a clipping space is defined between the protection member and the base, for receiving an electronic device. When the protection member is in the standing position, the protection member extends through the through hole to be engaged with the base, to support the base, and the positioning slot is configured to position the electronic device.

From a review of the foregoing citations in particular, and from a consideration of the prior art in general, it will be seen that the prior art thus perceives a need for a grooved case construction for enabling a user to removably receive an electronic device as exemplified by a tablet type computer and selectively cover that removably received electronic device with an encasing panel assembly with select surfacing of the case or cover construction being outwardly presented. Further, the prior art perceives a need for a grooved case construction for enabling a user to variously display the electronic device by way of simplified panel assembly cooperation and coupling with the rear or posterior side of a device-holding mechanism as summarized according to the present invention in more detail hereinafter.

SUMMARY OF THE INVENTION

Among the many objectives of this invention is the basic provision of a grooved case construction for selectively encasing or displaying an electronic device. In certain preferred embodiments, the grooved case construction preferably comprises a grooved device-holding mechanism and a multi-section panel assembly. In certain alternative embodiments, the grooved device-holding mechanism can be utilized in combination with a kickstand element. Alternatively, the grooved device-holding mechanism can be utilized with both a panel assembly and a kickstand element. Central to the practice of the present invention is the grooved device-holding mechanism.

The device-holding mechanism is preferably sized and shaped to removably receive an electronic device as typified by a mobile phone or tablet computer. The device-holding mechanism comprises a cavity-type, anterior device-receiving section, a posterior component interface, a peripheral mechanism edging, a mechanism length, a mechanism width, and a mechanism depth. The posterior component interface comprises at least one, but preferably a plurality of component-receiving grooves each of which are characterized by comprising a deep channel and a superficial slot. The deep channel has a channel width and the superficial slot has a slot width less than the channel width.

The multi-section panel assembly according to the present invention preferably comprises a first panel section, a second panel or spine section, and a third panel section. The first panel section primarily interfaces with the posterior component interface and comprising a first panel length, a first panel width, a first mechanism-supportive material, a first interface-attachment structure, and a first panel thickness adjacent the first interface-attachment structure. The second panel or spine section flexibly interconnects the first and third panel sections and comprises a second panel length and a second panel width. The third panel primarily covers the anterior device-receiving section and comprises a third panel length, a third panel width, and a second mechanism-supportive material.

The first interface-attachment structure is essentially a cylindrical body type element receivable in the cylindrically hollow deep channel such that the first panel section adjacent the first interface-attachment structure is simultaneously receivable via the superficial slot for connecting the multi-section panel assembly to the device-holding mechanism. The first panel width is lesser than the mechanism width for selectively covering a portion of the posterior component interface.

The second panel width is substantially equal to the mechanism depth for selectively covering a central portion of the outer mechanism edging. The third panel length and third panel width are substantially equal to the mechanism length and mechanism width respectively for selectively covering the anterior device-receiving section, and the peripheral mechanism edging is supportable atop the third panel section for selectively displaying the anterior device-receiving section.

The grooved case construction or device-holding mechanism according to the present invention preferably comprises at least one component-receiving groove that extends lengthwise relative to the mechanism length for selectively displaying the anterior device-receiving section in a landscape orientation relative to the multi-panel assembly. Preferably, the first panel length is lesser than the mechanism length and at least one lengthwise extending component-receiving groove comprises an abbreviated groove length. The abbreviated groove length is abbreviated relative to the mechanism length such that the first panel length may be positioned equidistant from the peripheral mechanism edging defining the mechanism length.

The grooved case construction or grooved device-holding mechanism according to the present invention may preferably comprise at least two lengthwise extending component-receiving grooves, each of which lengthwise extending, component-receiving grooves comprise an abbreviated groove length measured from opposing peripheral mechanism edging defining the mechanism length. The multi-section panel assembly is preferably reversible and is connectable to the posterior component interface in either of the at least two component-receiving grooves for selectively displaying the first side or second side of the reversible panel assembly.

The grooved case construction or grooved device-holding mechanism according to the present invention may further comprise at least two component-receiving grooves, one of which is a lengthwise extending component-receiving groove and one of which is a widthwise extending component-receiving groove. This arrangement enables the user to display the anterior device-receiving section (and received electronic device) in either a landscape or portrait orientation. When provided with at least two lengthwise grooves and at least two widthwise grooves, a grid-patterned posterior component interface is provided which enables or enhances reversible portrait and landscape orientations.

In other words, the first interface-attachment structure is receivable in the deep channel of either a widthwise groove or lengthwise groove such that the first panel section adjacent the first interface-attachment structure is simultaneously receivable via the superficial slot of either the widthwise or lengthwise grooves for connecting the multi-section panel assembly to the device-holding mechanism for either portrait or landscape orientation display of the device-holding mechanism relative to the multi-section panel assembly.

The anterior device-receiving cover panel or third panel section comprises a groove-engaging tip element or structure at its free edge. The tip element or structure is structurally cooperable with a select component-receiving groove akin to a tongue and groove type configuration. The third panel section is thereby usable as a prop support for the device-holding mechanism for enabling enhanced angled display of the device-holding mechanism upon a support surface. The tip element may optionally provide a second interface-attachment structure substantially similar to the first interface-attachment structure for coupling the multi-section panel assembly to the device-holding mechanism at two attachment groove sites.

The kickstand element is preferably sized and shaped for stowed receipt in at least one grooved pattern formed at the posterior component interface. The kickstand element is exemplified by comprising three slot-insertable sides and one channel-insertable side. The channel-insertable side comprises a channel side diameter, and is rotatably receivable in at least one deep channel. The channel side diameter is greater than the slot width for anchoring the kickstand element to the posterior component interface. The three slot-insertable sides each comprise a uniform slot side diameter that is cooperable with the slot width for both receipt in at least one grooved pattern, and removal from at least one grooved pattern for providing a prop support for the device holding mechanism.

Other objects of the present invention, as well as particular features, elements, and advantages thereof, will be elucidated or become apparent from, the following description and the accompanying drawing figures.

BRIEF DESCRIPTION OF THE DRAWINGS

Other features and objectives of the invention will become more evident from a consideration of the following brief descriptions of patent drawings:

FIG. 1A is a reduced anterior perspective view of the first alternative grooved case construction otherwise shown in FIG. 1 depicting a generic electronic device received in an anterior device-receiving section of the device-holding mechanism with the multi-section panel assembly attached to a posterior portion of the device-holding mechanism in an open case configuration.

FIG. 7 is an edge view of the multi-section panel assembly of the first alternative grooved case construction according to the present invention as viewed from the third panel section.

FIG. 8 is an first anterior plan view of the multi-section panel assembly of the first alternative grooved case construction according to the present invention with parts broken away of a first panel section to depict panel-based magnetic material.

FIG. 9 is an edge view of the multi-section panel assembly of the first alternative grooved case construction according to the present invention as viewed from the first panel section.

FIG. 10 is a top edge view of the multi-section panel assembly of the first alternative grooved case construction according to the present invention.

FIG. 11A is an enlarged sectional view of an edge detail as enlarged and sectioned from FIG. 10 to depict in greater detail a relatively thin edge structure of the third panel section.

FIG. 11B is an enlarged sectional view of an edge detail as enlarged and sectioned from FIG. 10 to depict in greater detail a first interface-attachment structure flexibly attached to the first panel section.

FIG. 14 is a first anterior plan view of the device-holding mechanism of the first alternative grooved case construction according to the present invention showing the anterior device-receiving section and presented on the same sheet as FIG. 15 for comparison purposes.

FIG. 15 is a first posterior plan view of the device-holding mechanism of the first alternative grooved case construction according to the present invention showing the posterior component interface with interface-based magnetic material depicted in hidden or broken lines and presented on the same drawing sheet as FIG. 14 for comparison purposes.

FIG. 25 is a second posterior plan view of the device-holding mechanism of the first alternative grooved case construction according to the present invention showing the posterior component interface with interface-based magnetic material depicted in hidden or broken lines.

FIG. 25A is a longitudinal cross-sectional view of the device-holding mechanism of the first alternative grooved case construction according to the present invention as sectioned from FIG. 25 showing in greater detail the posterior component interface with embedded interface-based magnetic material and component-receiving grooves.

FIG. 25B is an enlarged sectional view of a component-receiving groove as sectioned from FIG. 25A to show in greater detail the component-receiving groove.

FIG. 26A is an enlarged sectional view of a component-receiving groove as sectioned from FIG. 25B to show in still greater detail the component-receiving groove.

FIG. 26B is an enlarged detail view of a first interface-attachment structure according to the present invention, which first interface-attachment structure is receivable in the component-receiving groove to anchor the first panel section to the posterior component interface.

FIG. 26C is an enlarged detail view of a first interface-attachment structure as receive in a component-receiving groove to anchor the first panel section to the posterior component interface.

FIG. 27 is a first posterior perspective view of the first alternative grooved case construction according to the present invention showing the device-holding mechanism and the multi-section panel assembly attached to the posterior component interface of the device-holding mechanism, the first and third panel sections cooperating to support the device-holding mechanism in a first portrait orientation display configuration.

FIG. 28 is a second posterior perspective view of the first alternative grooved case construction according to the present invention showing the device-holding mechanism and the multi-section panel assembly attached to a posterior component interface of the device-holding mechanism, the first and third panel sections cooperating to support the device-holding mechanism in a second portrait orientation display configuration.

FIG. 29 is a third posterior perspective view of the first alternative grooved case construction according to the present invention showing the device-holding mechanism and the multi-section panel assembly attached to a posterior component interface of the device-holding mechanism, the first and third panel sections cooperating to support the device-holding mechanism in a third portrait orientation display configuration.

FIG. 30 is a first posterior plan view of a second alternative grooved case construction according to the present invention showing a device-holding mechanism and a multi-section panel assembly attached to the posterior component interface of the device-holding mechanism in an open case configuration with an arrow showing direction of linear translation of the multi-section panel assembly for attachment to the posterior component interface of the device-holding mechanism, the third panel section being outfitted with an optional second interface-attachment structure.

FIG. 31 is a first posterior perspective view of the second alternative grooved case construction according to the present invention showing the device-holding mechanism and the multi-section panel assembly attached to the posterior component interface of the device-holding mechanism in an open case configuration.

FIG. 32 is a first anterior perspective view of the second alternative grooved case construction according to the present invention showing the device-holding mechanism and the multi-section panel assembly attached to a posterior portion of the device-holding mechanism in an open case configuration.

FIG. 33 is a first anterior plan view of the device-holding mechanism of the second alternative groove case construction according to the present invention.

FIG. 34 is a first lateral edge view of the device-holding mechanism of the second alternative groove case construction according to the present invention.

FIG. 35 is a first posterior plan view of the device-holding mechanism of the second alternative groove case construction according to the present invention.

FIG. 36 is a first posterior perspective view of a combination device-holding mechanism and kickstand element according to the present invention showing the device-holding mechanism and a kickstand element in solid lining in both attached relation with the posterior component interface of the device-holding mechanism and in exploded relation therefrom.

FIG. 37 is a first posterior plan view of a combination device-holding mechanism and kickstand element according to the present invention showing the device-holding mechanism and the kickstand element in stowed receipt within a grooved pattern of the posterior component interface.

FIG. 41 is a second posterior plan view of the combination device-holding mechanism and kickstand element according to the present invention showing the device-holding mechanism and the kickstand element in stowed receipt within a grooved pattern of the posterior component interface, and presented on the same drawing sheet as FIG. 42 for comparison purposes.

FIG. 42 is a first anterior plan view of the combination device-holding mechanism and kickstand element according to the present invention, the kickstand element being hidden from view but presented on the same drawing sheet as FIG. 41 for comparison purposes.

FIG. 43 is a first lateral edge of the combination device-holding mechanism and kickstand element according to the present invention, the embedded kickstand element being viewable via groove entry points.

FIG. 43A is an enlarged sectional view of a channel-insertable side of the kickstand element as embedded with the posterior component interface of the device-holding mechanism as sectioned from FIG. 43.

FIG. 43B is an enlarged sectional view of a slot-insertable side of the kickstand element as embedded with the posterior component interface of the device-holding mechanism as sectioned from FIG. 43.

FIG. 43C is a further enlarged sectional view of the slot-insertable side as embedded with the posterior component interface of the device-holding mechanism as sectioned from FIG. 43B.

FIG. 43D is a further enlarged sectional view of the channel-insertable side as embedded with the posterior component interface of the device-holding mechanism as sectioned from FIG. 43A.

FIG. 44A is a first sequential diagrammatic depiction of a relatively large diameter slot-insertable side of the kickstand element before being directed through a superficial slot of a component-receiving groove.

FIG. 44B is a second sequential diagrammatic depiction of the relatively large diameter slot-insertable side of the kickstand element passing the plane of the superficial slot of the component-receiving groove elastically actuating and deforming the material construction of the posterior component interface during passage therethrough.

FIG. 44C is a third sequential diagrammatic depiction of the relatively large diameter slot-insertable side of the kickstand element having passed the plane of the superficial slot of the component-receiving groove elastically relaxing the material construction of the posterior component interface thereby being groove-received.

FIG. 44D is a first sequential diagrammatic depiction of a relatively small diameter slot-insertable side of the kickstand element before being directed through a superficial slot of a component-receiving groove.

FIG. 44E is a second sequential diagrammatic depiction of the relatively small diameter slot-insertable side of the kickstand element passing the plane of the superficial slot of the component-receiving groove.

FIG. 44F is a third sequential diagrammatic depiction of the relatively small diameter slot-insertable side of the kickstand element having passed the plane of the superficial slot of the component-receiving groove.

DETAILED DESCRIPTION OF THE PREFERRED EMBODIMENTS

Figure 1:
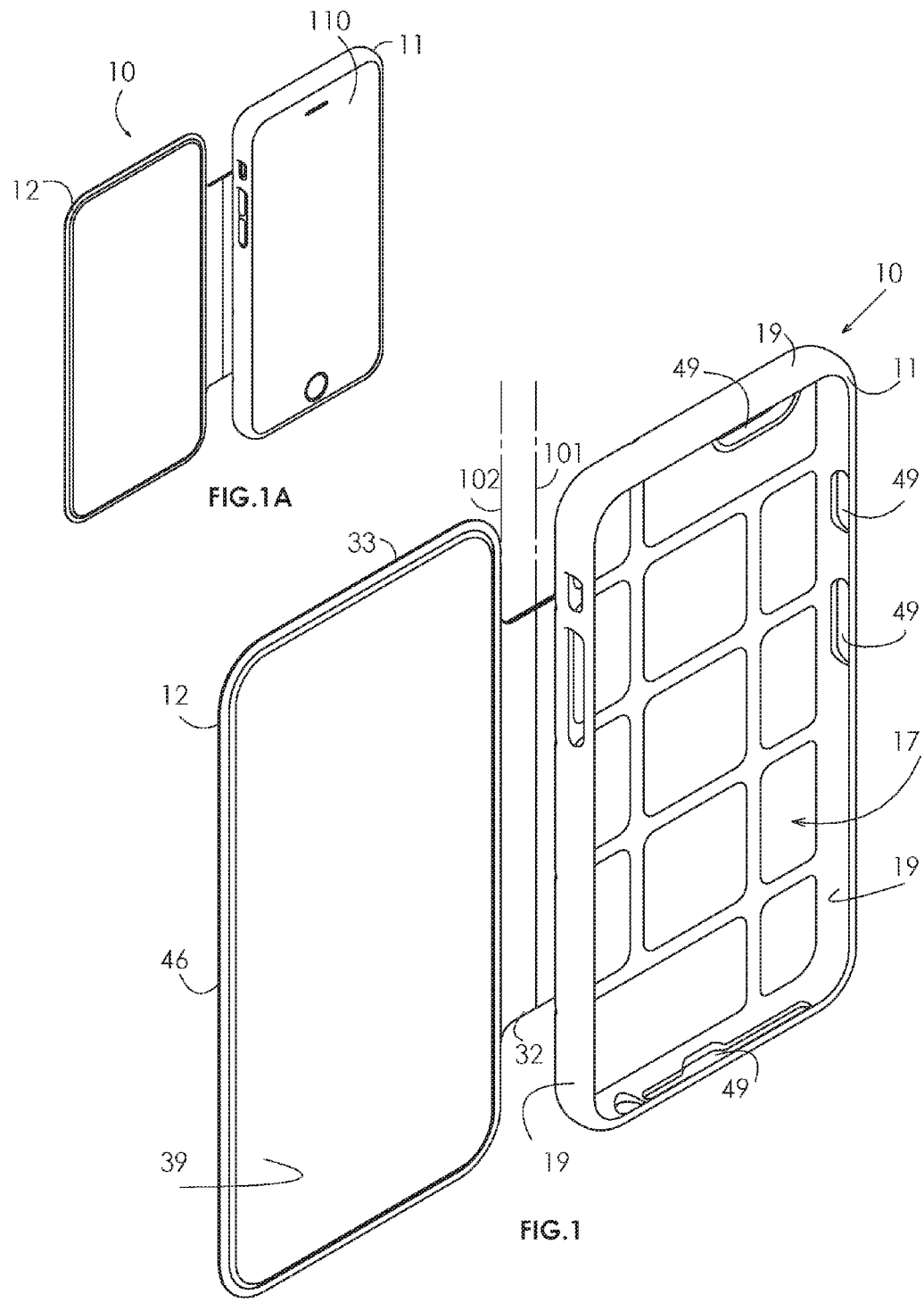
FIG. 1 is a first anterior perspective view of a first alternative grooved case construction according to the present invention showing a device-holding mechanism and a multi-section panel assembly attached to a posterior portion of the device-holding mechanism in an open case configuration.
Figure 2:
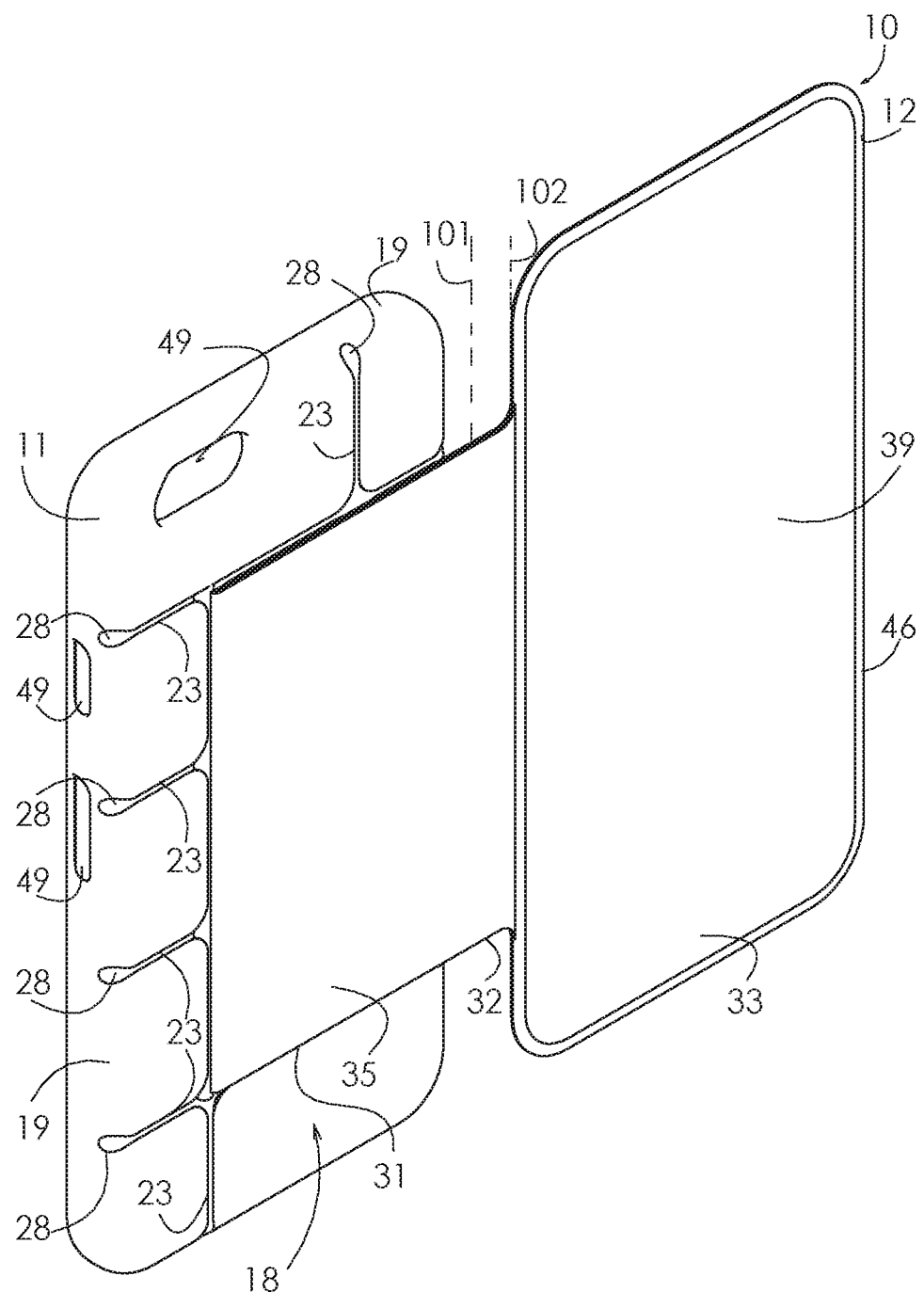
FIG. 2 is a first posterior perspective view of the first alternative grooved case construction according to the present invention showing the device-holding mechanism and the multi-section panel assembly attached to a posterior component interface of the device-holding mechanism in an open case configuration.
Figure 3:
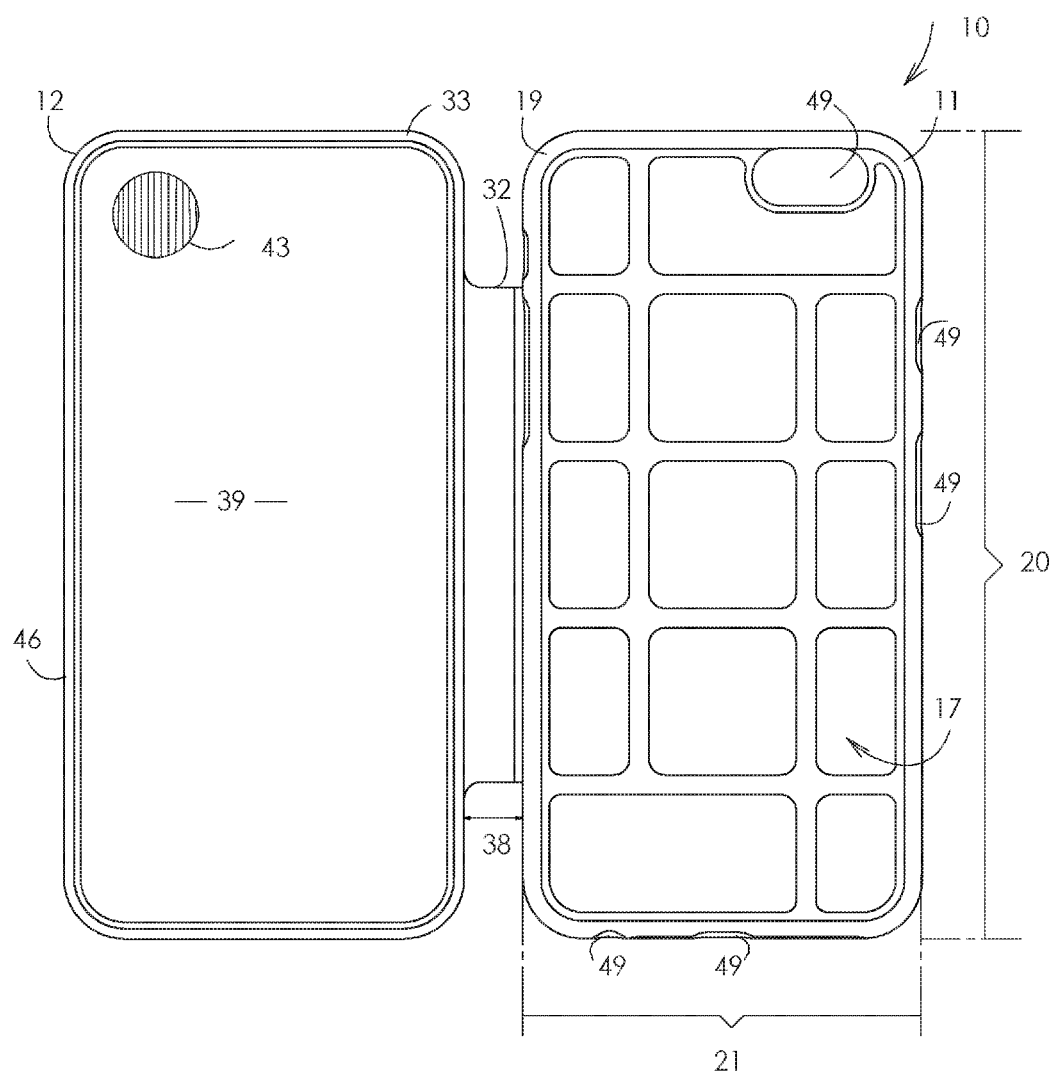
FIG. 3 is a first anterior plan view of the first alternative grooved case construction according to the present invention showing the device-holding mechanism and the multi-section panel assembly attached to a posterior portion of the device-holding mechanism in an open case configuration.
Figure 4:
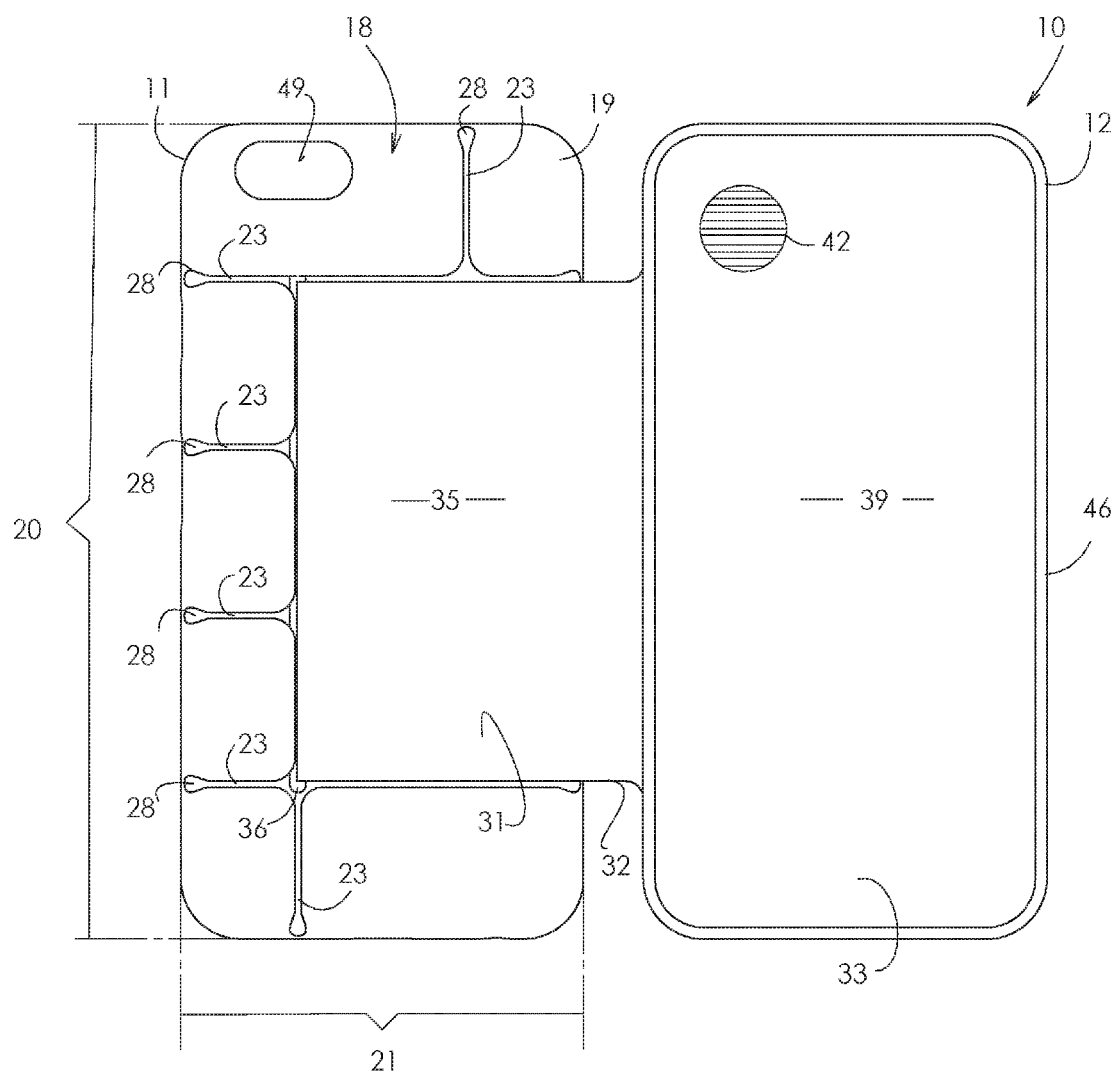
FIG. 4 is a first posterior plan view of the first alternative grooved case construction according to the present invention showing the device-holding mechanism and the multi-section panel assembly attached to the posterior component interface of the device-holding mechanism in an open case configuration.

Referring now to the drawings with more specificity, the present invention preferably provides a case construction as variously exemplified for selectively encasing and/or displaying an electronic device such as a mobile phone, tablet computer, or similar other electronic device as generically depicted and referenced at 110. The preferred case construction(s) 10 and 13 according to the present invention may be said to comprise or include a device-holding mechanism 11 and a multi-section panel assembly as at 12. Case construction 10 depicts a relatively smaller phone-holding case construction and case construction 13 depicts a relatively larger tablet-holding case construction.

The device-holding mechanism 11 is believed central to the practice of the present invention the features of which are applicable to all embodiments, including alternative embodiment 14. Embodiment 14 depicts a tablet-type device holding mechanism 11 outfitted with a kickstand element 15 and a keyboard assembly 16. Both the kickstand element 15 and the keyboard assembly 16 connect to the device-holding mechanism 11 via the particularly structured posterior component interface 18 of the device-holding mechanism 11. Embodiment 14 is depicted to highlight the varied functionality of the posterior component interface 18 of the device-holding mechanism believed central to the practice of the present invention.

The device-holding mechanism 11 is basically a shell or cradle type article sized and shaped to removably receive an electronic device 110 as generally depicted in FIG. 1A. The device-holding mechanism 11 preferably and essentially comprises an anterior, cavity-type device-receiving section as at 17; a posterior component interface as earlier referenced at 18; an outer mechanism edging as at 19; a mechanism length 20; a mechanism width 21; and a mechanism depth as at 22. The device-holding mechanism may also be preferably outfitted with certain apertures as at 49 to allow feature functionality of the received electronic device via the mechanism 11 such as a camera or video lens as at 50 or device buttons as at 51.

The posterior component interface 18 is a key feature of the present invention and may be said to preferably comprise or include at least one, but preferably a plurality of intersecting, component-receiving grooves as at 23. Each component-receiving groove 23 is characterized by including or comprising a deep (as opposed to superficial) channel portion as at 24; and a superficial slot or gap portion as at 25. The deep channel portions 24 are basically cylindrical hollows having a channel width or diameter as at 26, and the superficial slot or gap preferably has a slot width as at 27. The slot width 27 is preferably lesser in magnitude than the channel width or diameter 26 so that structures of sufficient girth received in the deep channel portion(s) 24 cannot be removed via the slot or gap portion(s) 25 and are thereby anchored to the posterior component interface 18 when engaged therewith or received thereby.

At least one component-receiving groove 23 extends lengthwise relative to or in the same dimension as the mechanism length 20 of the device-holding mechanism 11 for selectively displaying the anterior device-receiving section 17 of the device-holding mechanism 11 in a landscape orientation relative to the multi-panel assembly 12 as generally depicted in FIG. 29. The case construction 10 according to the present invention comprises a device-holding mechanism 11 comprising or including at least two (parallel) component-receiving grooves 23 extending in the lengthwise dimension, each of which have an abbreviated groove length 41 as measured from opposing outer mechanism edging 19 defining the mechanism length 20 as generally depicted and referenced in FIG. 6.

Figure 6:
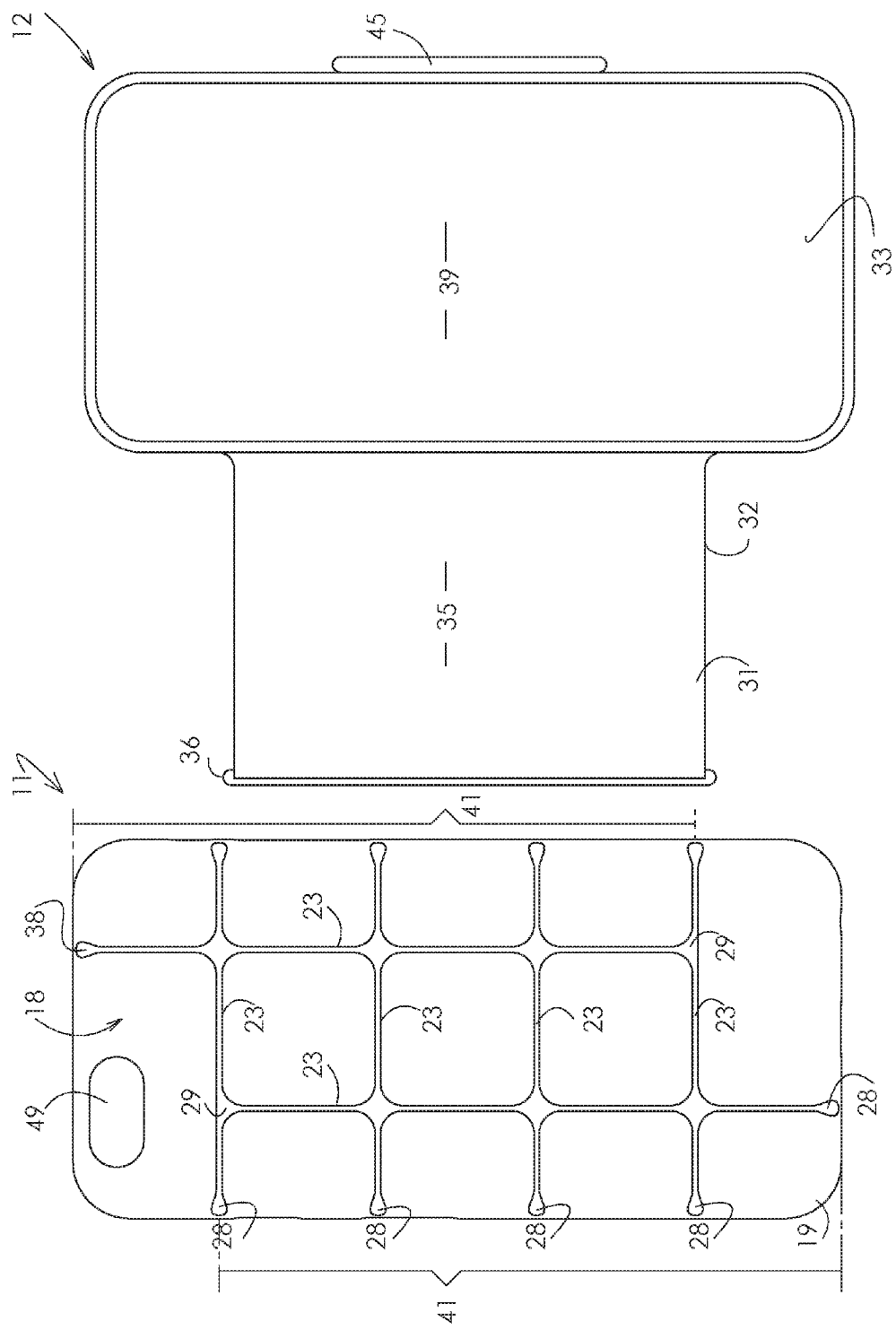
FIG. 6 is a first posterior exploded view of the first alternative grooved case construction according to the present invention showing the device-holding mechanism and the multi-section panel assembly in disassembled relation to one another.
Figure 12:
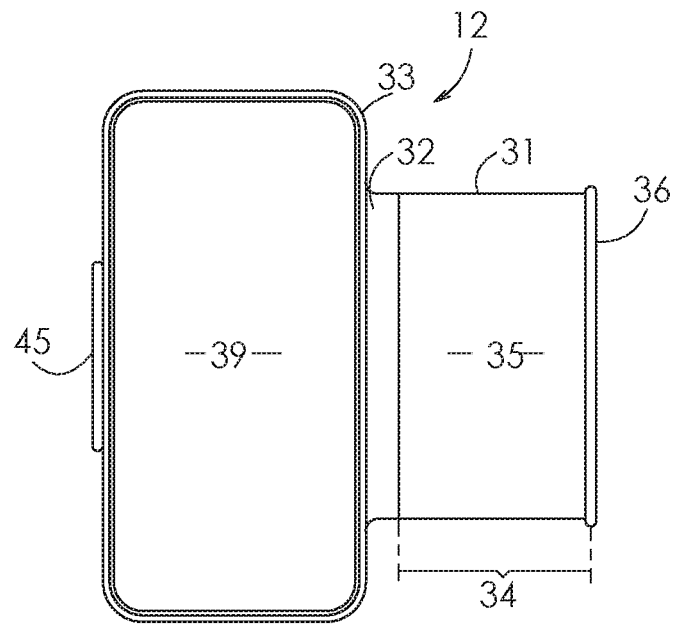
FIG. 12 is a second anterior plan view of the multi-section panel assembly of the first alternative grooved case construction according to the present invention shown on the same drawing sheet as FIG. 13 for comparison purposes.
Figure 13:
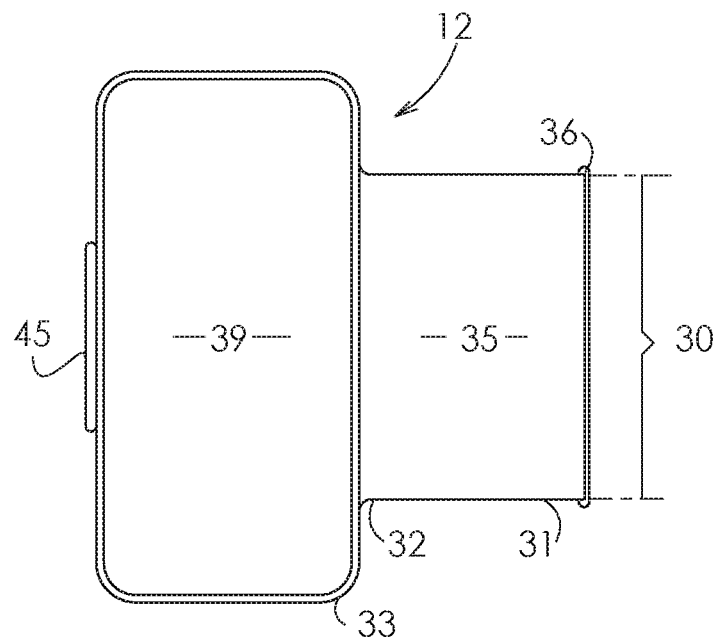
FIG. 13 is a posterior plan view of the multi-section panel assembly of the first alternative grooved case construction according to the present invention shown on the same drawing sheet as FIG. 12 for comparison purposes.
Figure 19:
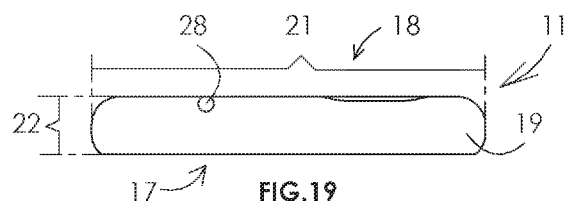
FIG. 19 is a top edge view of the device-holding mechanism of the first alternative grooved case construction according to the present invention.
Figure 16:
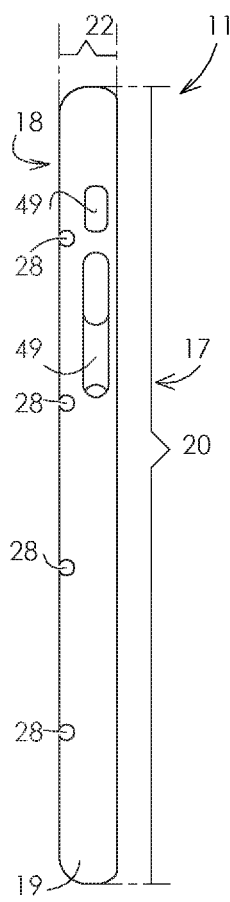
FIG. 16 is a first lateral edge view of the device-holding mechanism of the first alternative grooved case construction according to the present invention.
Figure 17:
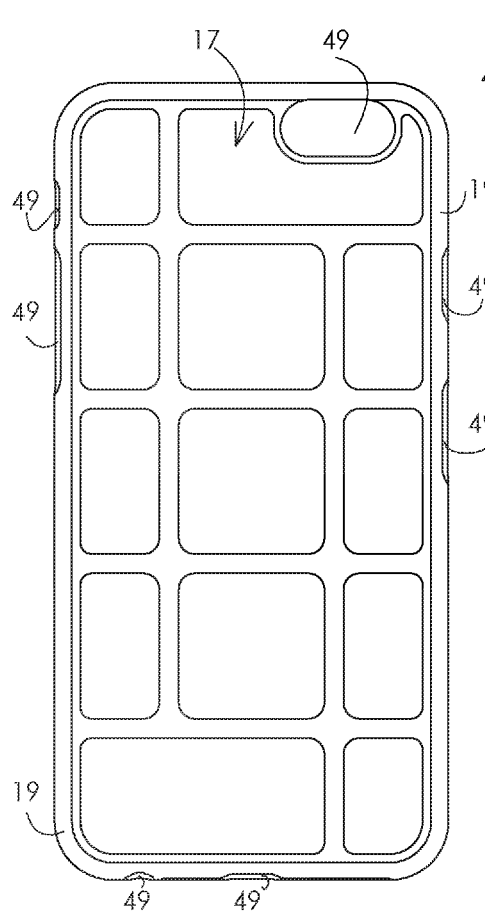
FIG. 17 is a second anterior plan view of the device-holding mechanism of the first alternative grooved case construction according to the present invention showing the anterior device-receiving section and presented on the same sheet as FIGS. 16 and 18-20 for comparison purposes.
Figure 18:
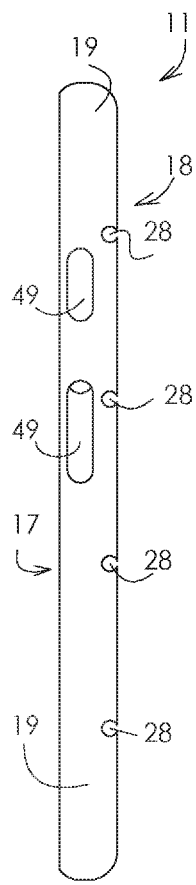
FIG. 18 is a second lateral edge view of the device-holding mechanism of the first alternative grooved case construction according to the present invention.
Figure 20:
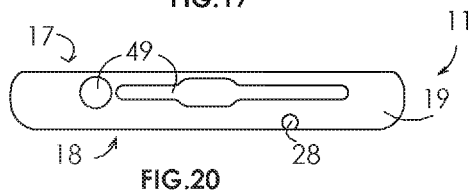
FIG. 20 is a bottom edge view of the device-holding mechanism of the first alternative grooved case construction according to the present invention.
Figure 21:
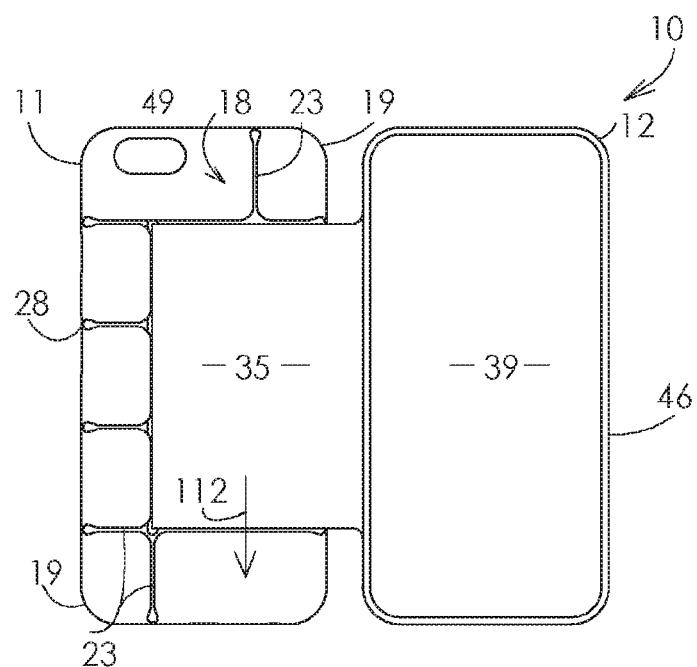
FIG. 21 is a second posterior plan view of the first alternative grooved case construction according to the present invention showing the device-holding mechanism and the multi-section panel assembly attached to the posterior component interface of the device-holding mechanism in an open case configuration with an arrow showing direction of linear translation of the multi-section panel assembly for detachment from the posterior component interface of the device-holding mechanism, the third panel section having a thin edge structure.
Figure 22:
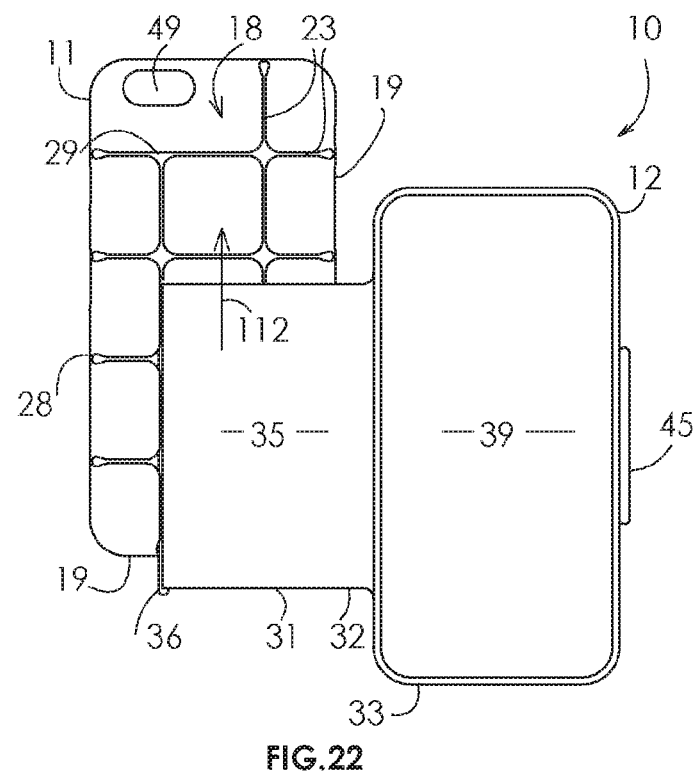
FIG. 22 is a third posterior plan view of the first alternative grooved case construction according to the present invention showing the device-holding mechanism and the multi-section panel assembly attached to the posterior component interface of the device-holding mechanism in an open case configuration with an arrow showing direction of linear translation of the multi-section panel assembly for attachment to the posterior component interface of the device-holding mechanism, the third panel section being outfitted with an optional second interface-attachment structure.

Referencing FIG. 6, the reader will further consider that the case construction 10 may also comprise at least one, but preferably a plurality of widthwise extending component-receiving grooves 23, which widthwise extending component-receiving grooves 23 essentially extend the entire mechanism width 21. It is contemplated that at least two lengthwise extending component-receiving grooves 23 and at least two widthwise extending component-receiving grooves 23 operate form a grid-patterned, grooved posterior component interface 18, which grid-patterned grooved posterior component interface 18 is central to the preferred practice of the device-holding mechanism(s) 11.

The device-holding mechanism 11 of case construction 13, for example, may comprise relatively more grooves 23 due to the relatively larger size of a typical tablet computer as compared to a typical phone. The device-holding mechanism 11 of case construction 13 is depicted as comprising four lengthwise extending component-receiving grooves 23 (two of which comprise abbreviated groove lengths 41 and two of which comprise full length lengthwise grooves 23) and six widthwise extending component-receiving grooves 23 which grooves intersect in a grid-like pattern thereby forming a relatively more accentuated grid-patterned grooved posterior component interface 18 as generally depicted in FIG. 35.

Lengthwise extending component-receiving grooves 23 that are abbreviated in length or comprise groove lengths 41 may be distinguished from widthwise extending component-receiving grooves 23 and full length lengthwise extending component-receiving grooves 23 as being characterized by featuring only a single entry point 28. The groove ends 29 opposite the entry points 28 of the component-receiving grooves 23 comprising abbreviated groove lengths 41 are preferably formed at a T-junction at which junction widthwise extending component-receiving groove(s) 23 intersect the groove ends 29. The groove ends 29 thereby provide stop structure for preventing further linear movement (as depicted at arrow 112) of structure translatably received in the applicable component-receiving grooves 23.

The multi-section panel assembly 12 of case constructions 10 and 13 preferably comprise or includes a first panel section 31, a second panel or spine section 32, and a third panel section 33. The first panel section 31 primarily functions to interface with or connect to the posterior component interface 18 and comprises a first panel length as at 30; a first panel width as at 34; a first mechanism-supportive material, panel, or body as at 35; a first interface-attachment structure or body 36; and a first panel thickness 37 adjacent the first interface-attachment structure or body 36. The first interface-attachment structure or body 36 is basically a cylindrical body sized so as to be receivable in the cylindrical hollow of the deep channel 24.

The second panel or spine section 32 primarily functions to flexibly interconnect the first and third panel sections 31 and 32 via at least a first pivot axis 101 and at least a second pivot axis 102 respectively and comprises a second panel or spine length equal to the first panel length 30 and a second panel width as at 38. The third panel section 33 primarily functions to cover the anterior device-receiving section 17 (and received electronic device 110) and comprises a third panel length substantially equal to the mechanism length 20; a third panel width substantially equal to the mechanism width 21; and a second mechanism-supporting material, panel, or body as at 39.

The first and second mechanism-supportive materials, panels, or bodies 35 and 39 have sufficient rigidity to support the device-holding mechanism 11 and a received electronic device 110 in a propped or angled support position as generally depicted in FIGS. 27-29. The first interface-attachment structure or body 36 has a girth or diameter 40 less than the channel width or diameter 26, and is receivable in the deep channel 24 of a select component-receiving groove 23 such that the first panel thickness 37 of the first panel section 31 is simultaneously receivable via the superficial slot 25 of said groove 23 for connecting and anchoring the multi-section panel assembly 12 to the device-holding mechanism 11.

The first panel width 31 is preferably less than the mechanism width 21 for selectively covering a portion of the posterior component interface 18 extending from the component-receiving groove 23 site of attachment. The second panel width 38 is preferably substantially equal to the mechanism depth 22 for selectively covering a portion of the outer mechanism edging 19. The third panel length and third panel width are substantially equal to the mechanism length 20 and mechanism width 21 respectively for selectively covering the anterior device-receiving section 17. The outer mechanism edging 19 is also supportable atop the third panel section 33 for selectively displaying the anterior device-receiving section 17. Thus, the case construction 10 effectively functions to either encase or display the electronic device 110 as received in the anterior device-receiving section 17.

It will be recalled that certain component-receiving grooves 23 extending lengthwise comprise an abbreviated groove length 41 defined by the groove ends 29 and entry points 28. The reader will further note that the first panel length 30 is preferably lesser than the mechanism length 20 such that the first panel length 30 may be positioned equidistant from the outer mechanism edging 19 defining the mechanism length 20 as generally depicted in FIGS. 2, 4, 21, 23, and 31. Further, the first panel length 30 is at least equal to the mechanism width 21 such that when the first interface-attachment structure or body 36 is received in the deep channel 24 of a widthwise extending component-receiving groove 23 with the first panel thickness 37 of the first panel section 31 being simultaneously received via the superficial slot 25, such connection enables a portrait orientation display of the device-holding mechanism 11 relative to the multi-section panel assembly 12 as generally depicted in FIGS. 27 and 28.

The multi-section panel assembly 12 is preferably reversible. Reversible properties are well known in the arts and typically provide two finished usable sides or provide some article that is usable with either of two sides in an outward manner. Thus, the multi-section panel assembly 12 preferably includes or comprises a first side and a second side. Accordingly, the first and second sides of the multi-section panel assembly 12 preferably comprise differing physical properties, including but not limited to differing perceptually tactile and visual properties for enabling the user to select a preferred physical property from the group consisting of the differing physical properties for outward presentation of the preferred physical property at any given time.

Figure 5:
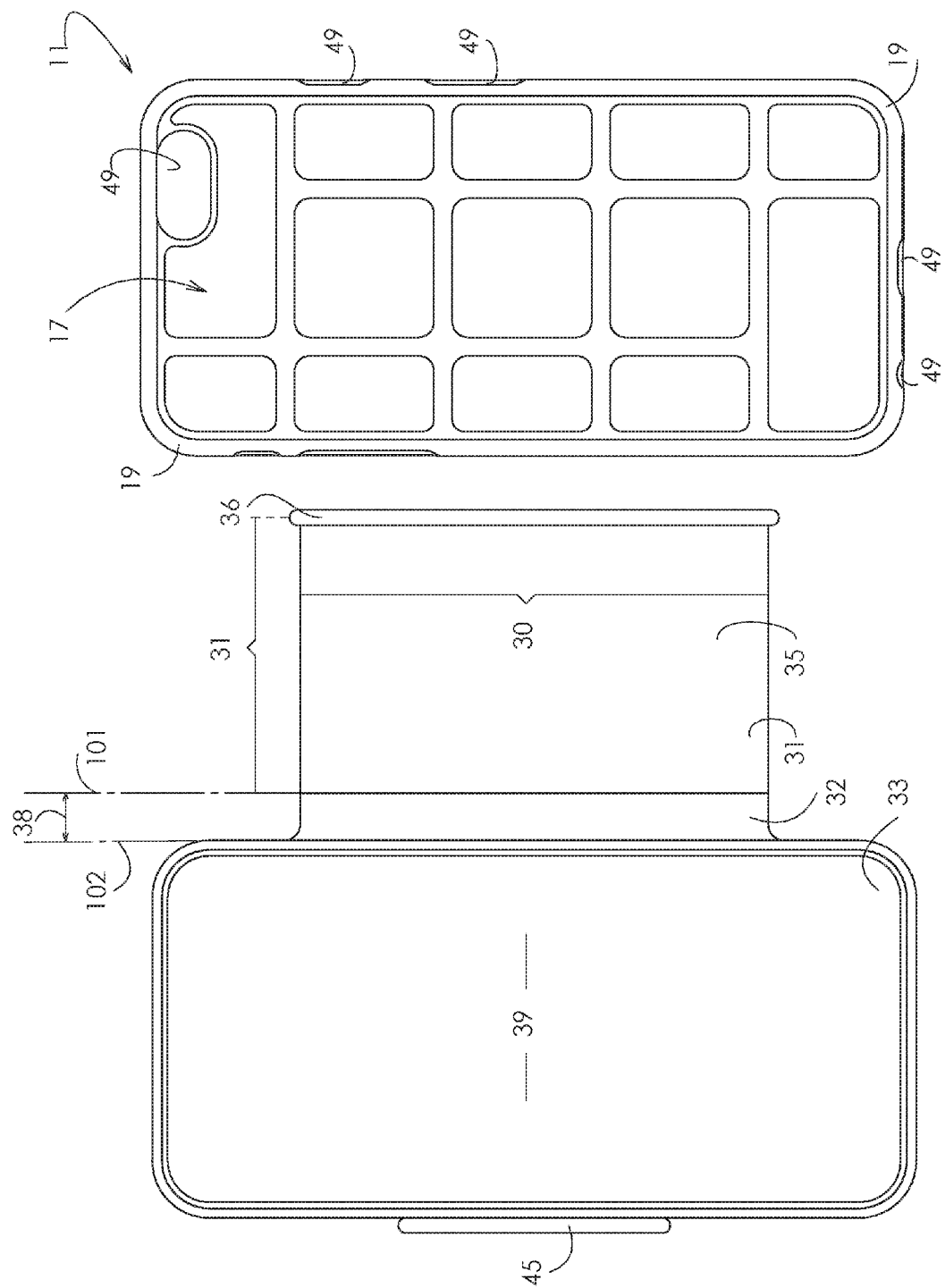
FIG. 5 is a first anterior exploded view of the first alternative grooved case construction according to the present invention showing the device-holding mechanism and the multi-section panel assembly in disassembled relation to one another.

In this regard, the first and second sides primarily and preferably comprise differing visual properties for enabling the user to select a preferred visual property from the group consisting of the differing visual properties for outward appearances. Comparatively referencing FIGS. 4 and 5, for example, the reader will there see depictions of vertical hatch markings as at 43 and horizontal hatch markings as at 42. Vertical hatch markings 43 represent a first group of physical (e.g. visual) properties and horizontal hatch markings 42 represent a second group of physical (e.g. visual) properties.

The vertical hatch markings 43 have been chosen to represent a first type of physical property only and should not be construed to embrace only a first type of coloration characterized by red or pink under the color hatch marking examples of 37 C.F.R. 1.84(n). Similarly, horizontal hatch markings 42 have been chosen to represent a second type of physical property only and should not be construed to embrace only a second coloration characterized by blue under the color hatch marking examples of 37 C.F.R. 1.84(n).

Noting that the first and second sides of the multi-section panel assembly 12 comprise differing physical characteristics, the multi-section panel assembly is connectable to the posterior component interface 18 in either of the at least two component-receiving grooves 23 having abbreviated groove lengths 41 for selectively displaying the first side or second side. The first panel thickness 37 at the first panel section 31 at the first interface-attachment structure or body 36 is preferably flexible (as at 44 in FIG. 11B) for enhancing (a) pivotal movement of the first panel section 31 relative to the posterior component interface 18 and (b) display of the electronic device 110 as received in the anterior device-receiving section 17.

The third panel section 33 may comprises a groove-engaging tip or edging structure, the tip or edging structure being cooperable with a select component-receiving groove 23 for either insertion through the superficial slot 25 when in a thin edge configuration as at 46 in FIG. 11A, or as a second interface-attachment structure or body as at 45 (substantially similar in form and function to the first interface-attachment structure or body 36) for anchored receipt within the deep channel 24.

FIGS. 27 and 28 depict edge configuration 46 inserted into a component-receiving groove 23 via a superficial slot 25. The second interface attachment structure or body 45 operates in the same manner as first interface attachment structure or body 36. The multi-section panel assembly 12 may thus be usable as a prop support for the device-holding mechanism 11, which prop support enables enhanced angled display of the device-holding mechanism 11 upon a support surface.

The reader should note that when outfitted with a second interface-attachment structure or body as at 45, the resulting case constructions 10 and 13 comprise first and second interface attachment structures that cooperate to couple the multi-section panel assembly 12 to the device-holding mechanism 11 at two attachment or anchor groove sites. Both the first panel section 31 and the third panel section 33 must be inserted into parallel component-receiving grooves 23 via the entry points 28 and translated into position. When outfitted with the thin edge configuration, the thin edge 46 can simply be inserted into the superficial slot 25 without the structural requirement of having to translate the third panel assembly 33 along a component-receiving groove 23 into position.

It should be further noted and/or recalled that the first panel width 31 is lesser than the mechanism width 21 and the third panel width equal to the mechanism width. Given this structural detail, the reader is directed to FIGS. 27-29, which figures depict the grooved case construction 10 in a number of variously angled display positions. The multi-section panel assembly can be variously inserted into any number of component-receiving grooves 23 and can be utilized with the first panel section in an up orientation relative to the third panel section (as depicted in FIGS. 27 and 29) or in a down orientation relative to the third panel section (as depicted in FIG. 28). The differing widths 21 and 31 thus provide the user with heightened ability to vary the display angles.

Figures 23, 24:
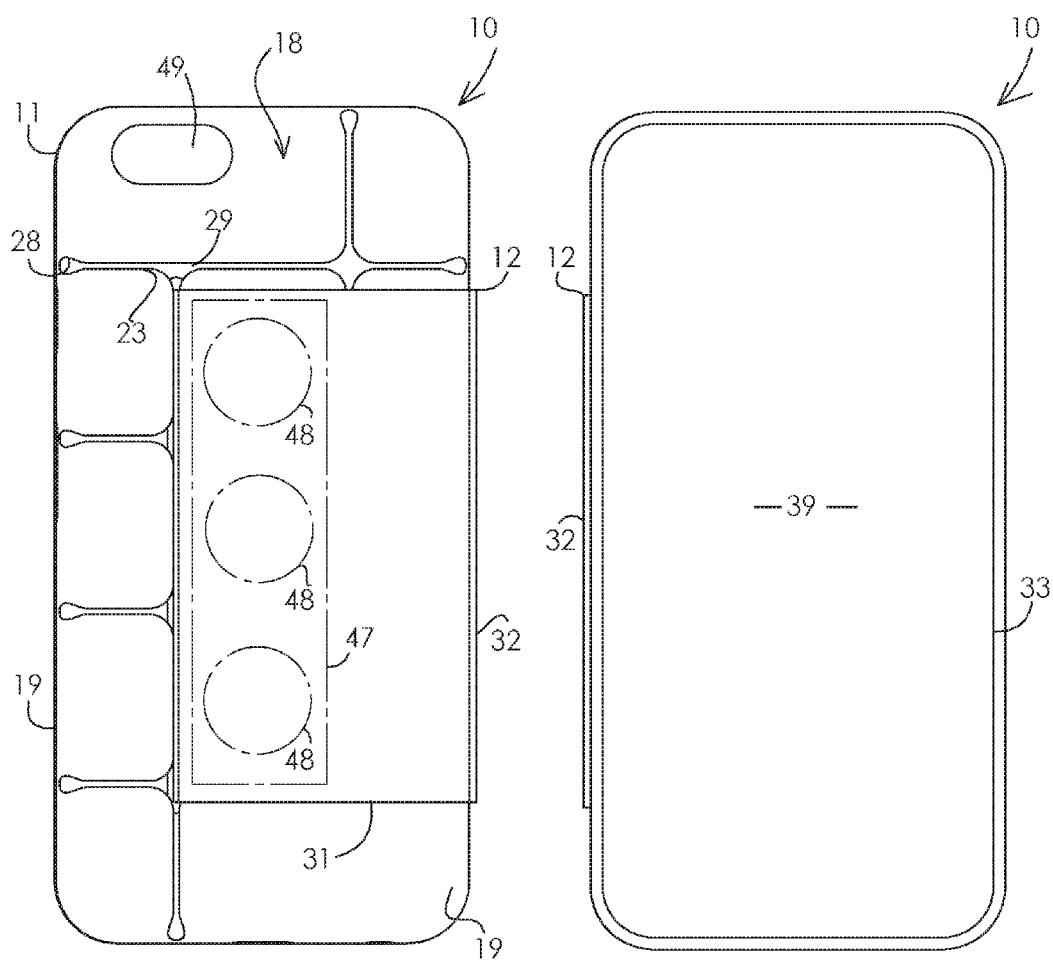
FIG. 23 is a second posterior plan view of the first alternative grooved case construction according to the present invention showing the device-holding mechanism and the multi-section panel assembly attached to the posterior component interface of the device-holding mechanism in a closed case configuration with panel-based and interface-based magnetic material shown in hidden or broken lines.
FIG. 24 is a second anterior plan view of the first alternative grooved case construction according to the present invention showing the device-holding mechanism and the multi-section panel assembly attached to a posterior portion interface of the device-holding mechanism in a closed case configuration.
Figures 23A, 24A:
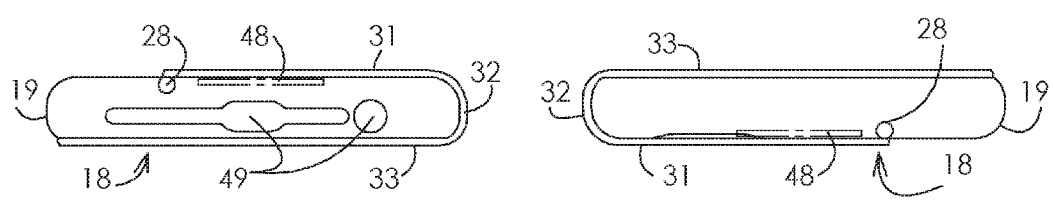
FIG. 23A is a bottom edge view of the of the first alternative grooved case construction according to the present invention showing the device-holding mechanism and the multi-section panel assembly attached to the posterior component interface of the device-holding mechanism in the closed case configuration, the first panel section being magnetically attracted to the posterior component interface for maintaining a low profile of the first alternative grooved case construction when in the closed case configuration.
FIG. 24A is a bottom edge view of the of the first alternative grooved case construction according to the present invention showing the device-holding mechanism and the multi-section panel assembly attached to the posterior component interface of the device-holding mechanism in the closed case configuration, the first panel section being magnetically attracted to the posterior component interface for maintaining a low profile of the first alternative grooved case construction when in the closed case configuration.
Figure 39:
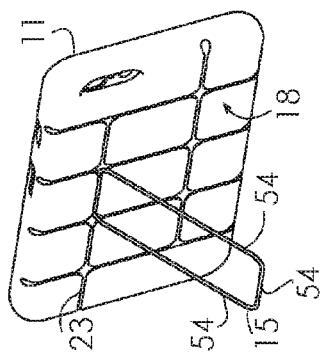
FIG. 39 is a third posterior perspective view of a combination device-holding mechanism and kickstand element according to the present invention showing the device-holding mechanism and kickstand element in a second portrait orientation display configuration.
Figure 40:
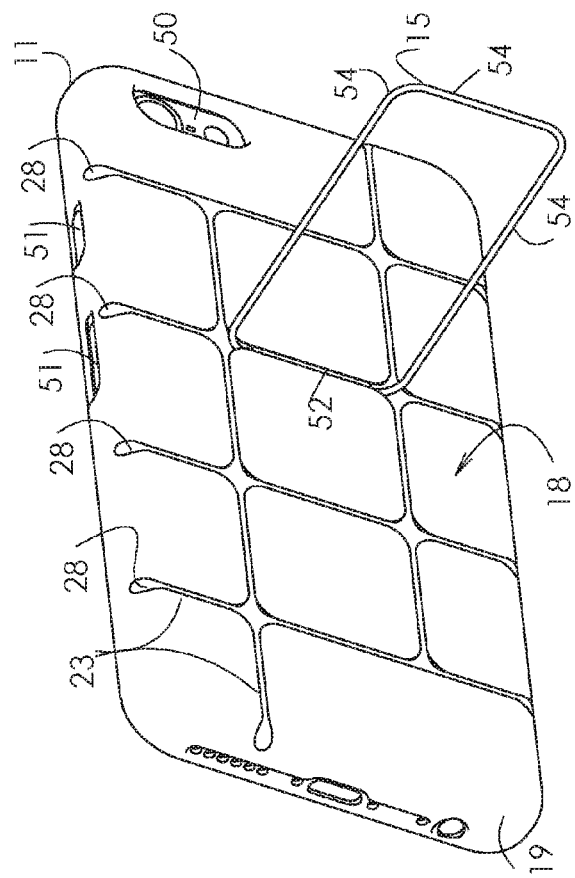
FIG. 40 is a third posterior perspective view of a combination device-holding mechanism and kickstand element according to the present invention showing the device-holding mechanism and kickstand element in a first landscape orientation display configuration.
Figure 38:
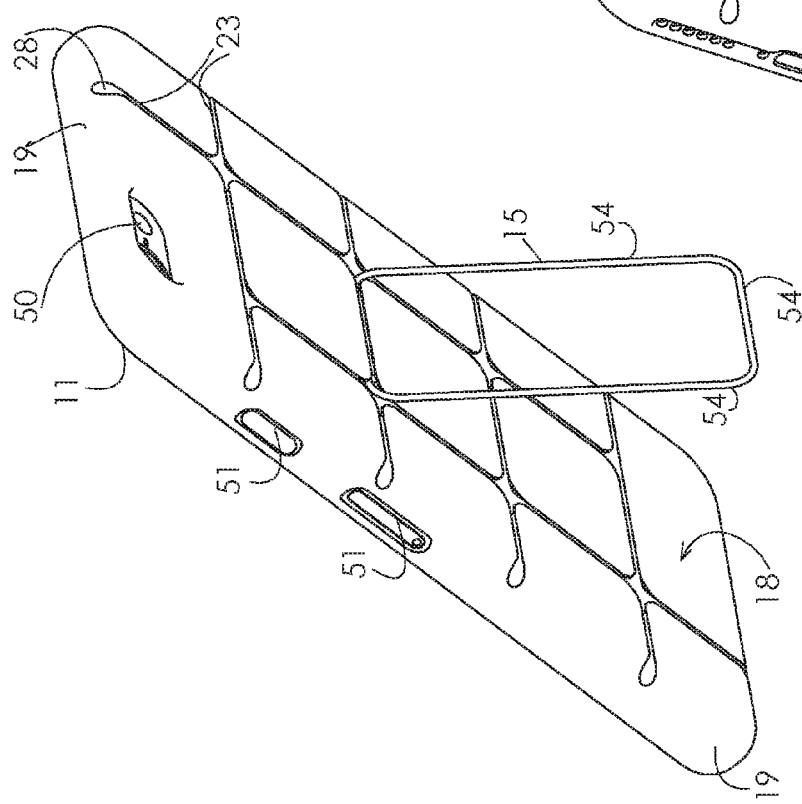
FIG. 38 is a second posterior perspective view of a combination device-holding mechanism and kickstand element according to the present invention showing the device-holding mechanism and kickstand element in a first portrait orientation display configuration.
Figure 45A:
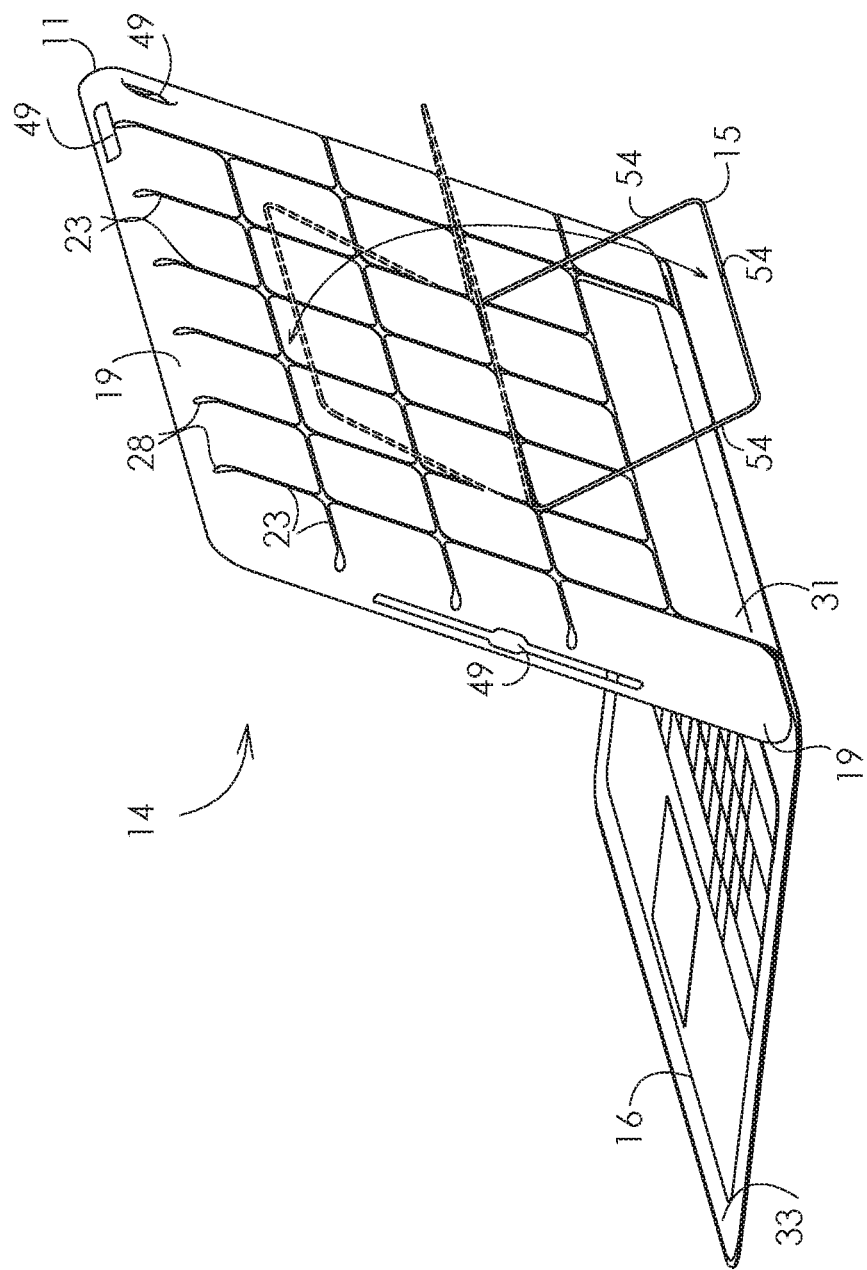
FIG. 45A is a first posterior perspective of a third alternative grooved case construction according to the present invention showing a device-holding mechanism, a kickstand element, and a keyboard type panel assembly attached to a posterior component interface of the device-holding mechanism in a first display configuration, and showing a kickstand element pathway in hidden or broken lines as it exits its stowed position into the first display configuration.
Figure 45B:
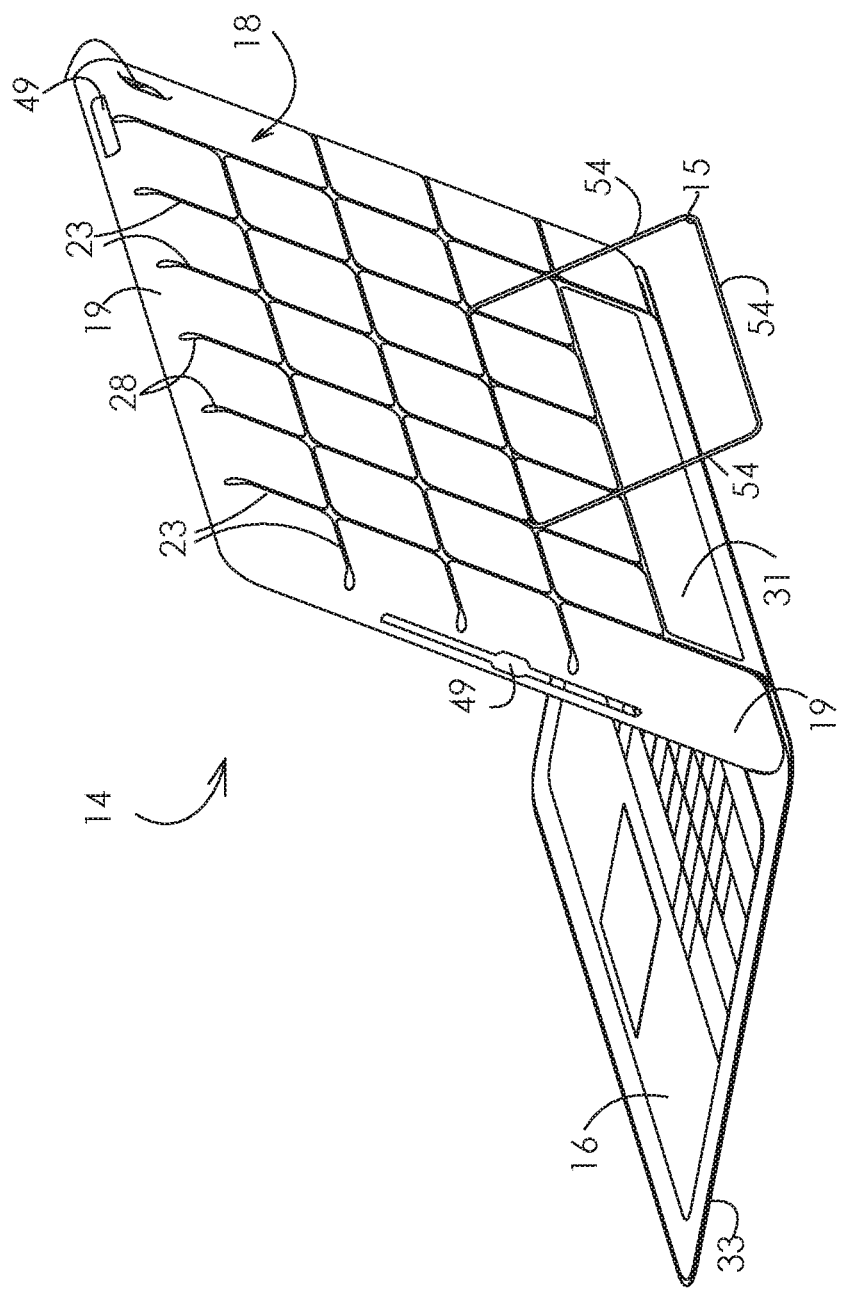
FIG. 45B is a second posterior perspective of the third alternative grooved case construction according to the present invention showing the device-holding mechanism, the kickstand element, and the keyboard type panel assembly attached to the posterior component interface of the device-holding mechanism in the first display configuration.

The case constructions 10 and 13 both preferably provide a posterior component interface 18 and first panel section 31 having magnetically attractive materials for retaining the first panel section 31 in flush engagement with the posterior component interface 18 when the third panel section 33 selectively covers the anterior device-receiving section 17. In this regard, the reader is directed to FIGS. 23A and 24A, which figures depict the first panel section 31 being tightly engaged with the posterior component interface 18 when the third panel section 33 is placed into a covering position relative to the anterior device-receiving section 17. FIGS. 8 and 23 depict panel-based magnetic material as at 47 and FIGS. 15 and 23 depict interface-based magnetic material as at 48.

As prefaced above, the device-holding mechanism(s) 11 according to the present invention may cooperate with a rectangular kickstand element as generally depicted and referenced at 15. The rectangular kickstand element 15 is preferably sized for receipt in at least one rectangular groove pattern defined by at least two intersecting lengthwise extending component-receiving grooves 23 and at least two widthwise extending component-receiving grooves 23 and basically comprises an angled wire member having four corners with a sleeve element 52 rotatably mounted upon one side of the angled wire member.

In other words, the kickstand element 15 preferably comprises three slot-insertable sides and one channel-insertable side, the channel-insertable side being that side outfitted with the sleeve element 52. The sleeve element 52 of the channel-insertable side preferably comprises a channel side diameter as at 53, and is rotatably receivable in a select deep channel 24 such that the channel side diameter 53 is greater than the slot width 27 and lesser than the channel width or diameter 26 for rotatably fastening or anchoring the kickstand element 15 to the posterior component interface 18.

The three slot-insertable sides as at 54 each comprise a substantially uniform slot side diameter that is receivable via three corresponding superficial slots 25 such that the kickstand element 15 may be rotatably received thereby and stowed within the three corresponding deep channels 24 and rotatably removed therefrom for providing a propped or angled support for the device holding mechanism(s) 11.

The uniform slot side diameter 57 may be either (a) less than the slot width 27 for free translation into and out of the deep channel(s) via the superficial slots 25 as generally depicted in FIGS. 44D-44F, or (b) greater than the slot width 27 with a resilient material construction at the slot interface for actuating (as at arrows 113) the slot width into a side-receiving configuration as generally depicted in FIG. 44B and relaxing (as at arrows 114) the slot width into a side-retaining configuration as generally depicted in FIG. 44C.

While the above descriptions contain much specificity, this specificity should not be construed as limitations on the scope of the invention, but rather as an exemplification of the invention. The basic invention may be said to essentially teach or disclose a case construction for selectively encasing or displaying an electronic device such as a smart phone or tablet computer as exemplified by case constructions 10 and 13 respectively. The case constructions 10 and 13 each preferably and essentially comprise a device-holding mechanism as at 11 and a multi-section panel assembly as at 12.

The device-holding mechanisms are sized and shaped to removably receive an electronic device, and comprise an anterior device-receiving section, a posterior component interface, outer or peripheral mechanism edging, a mechanism length, a mechanism width, and a mechanism depth as earlier referenced. The posterior component interface is central to the practice of the present invention and comprises at least one rectangular grooved pattern. The at least one rectangular grooved pattern may be preferably characterized by comprising at least four deep channels and at least four superficial slots in communication with one another whereby the deep channels have a substantially uniform channel width and the superficial slots have a substantially uniform slot width less than the channel width.

The multi-section panel assemblies comprise a first panel section, a second panel section, and a third panel section. The first panel section primarily interfaces with the posterior component interface and comprises a first panel length, a first panel width, a first mechanism-supportive material, a first interface-attachment structure, and a first panel thickness adjacent the first interface-attachment structure. The second panel section flexibly interconnects the first and third panel sections at a first pivot axis and a second pivot axis respectively and comprises a second panel length and a second panel width. The third panel primarily covers the anterior device-receiving section and comprises a third panel length, a third panel width, and a second mechanism-supportive material.

The first interface-attachment structure is receivable in a select deep channel such that the first panel section adjacent the first interface-attachment structure is simultaneously receivable via the superficial slot for connecting the multi-section panel assembly to the device-holding mechanism. The first panel width is lesser than the mechanism width for selectively covering a portion of the posterior component interface, and the second panel width being equal to the mechanism depth for selectively covering a portion of the outer mechanism edging.

The third panel length and third panel width are substantially equal to the mechanism length and mechanism width respectively for selectively covering the anterior device-receiving section when in a case closed configuration. The outer or peripheral mechanism edging is supportable atop the third panel section for selectively displaying the anterior device-receiving section when in a case display configuration. The case constructions thus function for selectively encasing or displaying the electronic device as received in the anterior device-receiving section.

Stated another way, the case construction according to the present invention selectively encases or displays an electronic device and includes or comprises a device-holding mechanism sized and shaped to removably receive an electronic device. The device-holding mechanism comprises an anterior device-receiving section, a posterior component interface, an outer or peripheral mechanism edging, a mechanism length, a mechanism width, and a mechanism depth.

The posterior component interface comprises at least one grooved pattern, which at least one grooved pattern is characterized by at least a first or at least one linear deep channel, at least a first or at least one linear superficial slot, and at least one end-interconnecting groove possibly defined by three corresponding component-receiving grooves (as at 23) in communication with the at least one linear deep channel and linear superficial slot. The at least one linear deep channel and superficial slot each have opposite ends, and the at least one end-interconnecting groove extends intermediate the opposite ends connecting the same and has a groove width, the at least one deep channel having a channel width and the at least one superficial slot having a slot width less than the channel width.

The case construction may further comprise a multi-section panel assembly as at 12 and/or a kickstand element 15. If outfitted with a multi-section panel assembly, it is contemplated that the third panel section 33 may effectively comprise a keyboard assembly as generally depicted and referenced at 16. In other words, case construction 14 only differs from case construction 13 by adding a keyboard feature to the third panel section. If outfitted with a kickstand element 15, the kickstand element is to be sized and shaped for receipt in the at least one groove pattern formed in the posterior component interface.

The kickstand element may thus be said to comprise a kick out portion as exemplified by the three slot-insertable sides and a linear channel side as exemplified by the channel-insertable side or sleeve element 52. In this regard, the linear channel side comprises a channel side diameter. The linear channel side is thereby rotatably receivable in a deep channel, and the channel side diameter is greater than the slot width for fastening the kickstand element to the posterior component interface. The kick out portion comprises a uniform thickness cooperable with the groove width for being both receivable in the groove pattern via the end-interconnecting groove, and removable from the groove pattern for providing a prop support for the device holding mechanism.

Accordingly, although the inventive grooved case construction has been described by reference to a number of embodiments, it is not intended that the novel grooved case construction be limited thereby, but that modifications thereof are intended to be included as falling within the broad scope and spirit of the foregoing disclosure, the following claims, and the appended drawings.

What is claimed is:

1. A case construction for selectively encasing and displaying an electronic device, the case construction comprising:
   a device-holding mechanism, the device-holding mechanism being sized and shaped to removably receive an electronic device, the device-holding mechanism comprising an anterior device-receiving section, a posterior component interface, a peripheral mechanism edging, a mechanism length, a mechanism width, and a mechanism depth, the posterior component interface comprising at least one component-receiving groove, each component-receiving groove being characterized by a deep channel and a superficial slot, the deep channel having a channel width and the superficial slot having a slot width less than the channel width; and
   a multi-section panel assembly, the multi-section panel assembly comprising a first panel section, a second panel section, and a third panel section, the first panel section for primarily interfacing with the posterior component interface and comprising a first panel length, a first panel width, a first interface-attachment structure, and a first panel thickness adjacent the first interface-attachment structure, the second panel section flexibly interconnecting the first and third panel sections and comprising a second panel length and a second panel width, the third panel section for primarily covering the anterior device-receiving section and comprising a third panel length, and a third panel width;
   the first interface-attachment structure being receivable in the deep channel such that the first panel section adjacent the first interface-attachment structure is simultaneously receivable via the superficial slot for connecting the multi-section panel assembly to the device-holding mechanism, the third panel length and third panel width being equal to the mechanism length and mechanism width respectively for selectively covering the anterior device-receiving section, the peripheral mechanism edging being supportable atop the third panel section for selectively displaying the anterior device-receiving section, the case construction thus for selectively encasing and displaying the electronic device as received in the anterior device-receiving section.

2. The case construction of claim 1 wherein the at least one component-receiving groove extends lengthwise relative to the mechanism length for selectively displaying the anterior device-receiving section in a landscape orientation relative to the multi-section panel assembly.

3. The case construction of claim 2 wherein the first panel length is lesser than the mechanism length and at least one component-receiving groove comprises an abbreviated groove length, the abbreviated groove length being abbreviated relative to the mechanism length such that the first panel length may be positioned equidistant from the peripheral mechanism edging defining the mechanism length.

4. The case construction of claim 3 comprising at least two component-receiving grooves, each component-receiving groove comprising an abbreviated groove length measured from opposing peripheral mechanism edging defining the mechanism length.

5. The case construction of claim 4 wherein the multi-section panel assembly is reversible and comprises a first side and a second side, the first and second sides comprising differing physical characteristics, the multi-section panel assembly being connectable to the posterior component interface in either of the at least two component-receiving grooves for selectively displaying the first side or second side.

6. The case construction of claim 5 wherein the posterior component interface and the first panel section comprise magnetically attractive materials, the magnetically attractive materials for retaining the first panel section in flush engagement with the posterior component interface when the third panel section selectively covers the anterior device-receiving section.

7. The case construction of claim 1 wherein the first panel section adjacent the first interface-attachment structure is flexible for enhancing pivotal movement of the first panel section relative to the posterior component interface and enhancing display of the electronic device as received in the anterior device-receiving section.

8. The case construction of claim 1 comprising at least two component-receiving grooves, the at least two component-receiving grooves comprising at least one lengthwise groove and at least one widthwise groove.

9. The case construction of claim 8 comprising at least two lengthwise grooves and at least two widthwise grooves for forming a grid-patterned posterior component interface.

10. The case construction of claim 8 wherein the first interface-attachment structure is receivable in the deep channel of the at least one widthwise groove such that the first panel section adjacent the first interface-attachment structure is simultaneously receivable via the superficial slot of the at least one widthwise groove for connecting the multi-section panel assembly to the device-holding mechanism for enabling portrait orientation display of the device-holding mechanism relative to the multi-section panel assembly.

11. The case construction of claim 9 wherein the third panel section comprises a groove-engaging tip element, the groove-engaging tip element being cooperable with a select component-receiving groove, the third panel section thereby being usable as a prop support for the device-holding mechanism, the prop support for enabling enhanced angled display of the device-holding mechanism upon a support surface.

12. The case construction of claim 11 wherein the tip element provides a second interface-attachment structure, the second interface-attachment structure being receivable in a select deep channel, the first and second interface-attachment structures thus for coupling the multi-section panel assembly to the device-holding mechanism.

13. A case construction for an electronic device, the case construction comprising:
a device-holding mechanism, the device-holding mechanism being sized and shaped to removably receive an electronic device, the device-holding mechanism comprising an anterior device-receiving section and a posterior component interface, the posterior component interface comprising at least one component-receiving groove each component-receiving groove being characterized by a deep channel and a superficial slot, each deep channel having a channel width and each superficial slot having a slot width less than the channel width.

14. The case construction of claim 13 comprising a multi-section panel assembly, the multi-section panel assembly comprising at least a first panel section and a second panel section flexibly connected to the first panel section, the first panel section comprising a first interface-attachment structure, the first interface-attachment structure being receivable in a select deep channel for anchoring the multi-section panel assembly to the device-holding mechanism, a portion of the first panel section extending from the first interface-attachment structure via a select superficial slot in communication with the select deep channel, the second panel section being sized and shaped for covering the anterior device-receiving section, the device-receiving mechanism being supportable atop the second panel section for selectively displaying the anterior device-receiving section.

15. A case construction an electronic device, the case construction comprising:
a device-holding mechanism, the device-holding mechanism being sized and shaped to removably receive an electronic device, the device-holding mechanism comprising an anterior device-receiving section and a posterior component interface, the posterior component interface comprising at least one component-receiving groove, each component-receiving groove being characterized by at least one linear, deep channel and at least one end-interconnecting superficial slot, each linear, deep channel having opposite ends and a channel width, each end-interconnecting superficial slot having a slot width less than the channel width and extending intermediate a select set of opposite ends for superficially connecting said ends.

16. The case construction of claim 15 comprising a panel assembly, the panel assembly comprising a first panel section flexibly connected to a second panel section, the first panel section comprising a first interface-attachment structure, the first interface-attachment structure being attachable to a select linear, deep channel for anchoring the panel assembly to the device-holding mechanism, a portion of the first panel section extending from the first interface-attachment structure via a select end-interconnecting superficial slot in communication with the select linear, deep channel, the second panel section being sized and shaped for covering at least a portion of the anterior device-receiving section, the device-holding mechanism being supportable via at least the first panel section for selectively displaying the anterior device-receiving section.

* * * * *